(12) United States Patent
Zhang et al.

(10) Patent No.: US 12,225,521 B2
(45) Date of Patent: Feb. 11, 2025

(54) CODEBOOK DESIGN FOR SEMI-PERSISTENT SCHEDULING (SPS) TRANSMISSIONS

(71) Applicant: Apple Inc., Cupertino, CA (US)

(72) Inventors: Yushu Zhang, Beijing (CN); Weidong Yang, San Diego, CA (US); Jie Cui, San Jose, CA (US); Haitong Sun, Cupertino, CA (US); Chunhai Yao, Beijing (CN); Hong He, San Jose, CA (US); Chunxuan Ye, San Diego, CA (US); Wei Zeng, Saratoga, CA (US); Dawei Zhang, Saratoga, CA (US); Oghenekome Oteri, San Diego, CA (US); Yang Tang, San Jose, CA (US); Sigen Ye, Whitehouse, NJ (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 17/441,778

(22) PCT Filed: Apr. 10, 2020

(86) PCT No.: PCT/CN2020/084211
§ 371 (c)(1),
(2) Date: Sep. 22, 2021

(87) PCT Pub. No.: WO2021/203417
PCT Pub. Date: Oct. 14, 2021

(65) Prior Publication Data
US 2023/0031360 A1 Feb. 2, 2023

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
None
See application file for complete search history.

(56) References Cited

U.S. PATENT DOCUMENTS

2012/0147992 A1\* 6/2012 Yang ................. H04L 25/03898
375/296
2017/0273056 A1\* 9/2017 Papasakellariou .. H04W 52/143
(Continued)

FOREIGN PATENT DOCUMENTS

CN 110505040 11/2019
CN 110662304 A \* 1/2020
(Continued)

OTHER PUBLICATIONS

LG Electronics: "Remaining issues on CA and HARQ-ACK codebook"; 3GPP Draft; R1-1804562; vol. RAN WG1; Apr. 7, 2018.
(Continued)

*Primary Examiner* — Andrew C Oh
(74) *Attorney, Agent, or Firm* — Eschweiler & Potashnik, LLC; Jennifer N Hinton

(57) ABSTRACT

Systems, methods, and circuitries are provided for configuring HARQ feedback for semi-persistent scheduling (SPS) physical downlink shared channel (PDSCH) communication. In one example, a method includes identifying a physical uplink control channel (PUCCH) resource in a first slot for communicating a hybrid automatic repeat request (HARQ) codebook. The method includes determining a set of SPS PDSCH receptions for which feedback is multiplexed in the HARQ codebook based on SPS PDSCH configurations for each component carrier and each slot, a UE capability for number of SPS PDSCH receptions per slot, and a prioritization protocol. The method includes
(Continued)

Case A

Case B

Case C selecting a codebook type based on whether a PDSCH is scheduled by way of a dynamic grant for any of the plurality of slots, constructing the HARQ codebook based on the set of SPS PDSCH receptions and the selected codebook type, and transmitting the HARQ codebook to a next generation node.

16 Claims, 10 Drawing Sheets

(56) References Cited

U.S. PATENT DOCUMENTS

| | | | | |
|---|---|---|---|---|
| 2020/0169357 A1* | 5/2020 | Lei | | H04L 1/0025 |
| 2020/0252168 A1* | 8/2020 | Kim | | H04W 72/1268 |
| 2020/0267597 A1* | 8/2020 | Huang | | H04W 76/14 |
| 2020/0313809 A1* | 10/2020 | Park | | H04L 1/1861 |
| 2020/0413424 A1* | 12/2020 | Fakoorian | | H04W 76/11 |
| 2022/0159692 A1* | 5/2022 | Lee | | H04L 5/0053 |
| 2023/0006798 A1* | 1/2023 | Lee | | H04L 1/1607 |
| 2023/0113163 A1* | 4/2023 | Takahashi | | H04W 72/04 |
| | | | | 714/748 |
| 2023/0361938 A1* | 11/2023 | He | | H04L 1/1854 |

FOREIGN PATENT DOCUMENTS

| | | | | | |
|---|---|---|---|---|---|
| CN | 111092704 | A | * | 5/2020 | H04L 1/1812 |
| CN | 111093276 | A | * | 5/2020 | H04L 1/1812 |
| CN | 111294186 | A | * | 6/2020 | H04L 5/0055 |
| CN | 111726204 | A | * | 9/2020 | H04L 1/1607 |
| CN | 111867070 | A | * | 10/2020 | H04L 5/0044 |
| CN | 112787765 | A | * | 5/2021 | H04L 1/1607 |
| CN | 112822775 | A | * | 5/2021 | H04L 1/1607 |
| CN | 113225162 | A | * | 8/2021 | H04L 1/1671 |
| CN | 111193578 | B | * | 3/2022 | H04L 1/1812 |
| JP | 2022177331 | A | * | 12/2022 | |
| WO | WO-2017160350 | A1 | * | 9/2017 | H04L 1/1614 |
| WO | WO-2017162205 | A1 | * | 9/2017 | H04L 1/16 |
| WO | 2019216620 | A1 | | 11/2019 | |
| WO | WO-2020029886 | A1 | * | 2/2020 | H04B 7/0417 |
| WO | WO-2020060339 | A1 | * | 3/2020 | H04B 7/0408 |
| WO | WO-2020143709 | A1 | * | 7/2020 | H04L 1/1607 |
| WO | WO-2020188822 | A1 | * | 9/2020 | H04L 1/1822 |
| WO | WO-2020194514 | A1 | * | 10/2020 | H04L 1/1812 |
| WO | WO-2020197195 | A1 | * | 10/2020 | H04L 1/1607 |
| WO | WO-2020204526 | A1 | * | 10/2020 | H04L 1/1812 |
| WO | WO-2020204560 | A1 | * | 10/2020 | |
| WO | WO-2021016888 | A1 | * | 2/2021 | H04L 1/1812 |
| WO | WO-2021064961 | A1 | * | 4/2021 | H04L 1/1812 |
| WO | WO-2021100982 | A1 | * | 5/2021 | H04B 7/0456 |
| WO | WO-2021176723 | A1 | * | 9/2021 | H04L 1/1816 |

OTHER PUBLICATIONS

European Extended Search Report mailed Nov. 15, 2023 in connection with Application No. 20929911.

3rd Generation Partnership Project; Technical Specification Group Radio Access Network; NR; Physical layer procedures for data (Release 16); 3GPP TS 38.214 V16.1.0; Mar. 2020.

LG Electronics; Summary#3 on maintenance of other aspects for URLLC/IIOT; 3GPP TSG RAN WG1 #100; R1-2001225; Feb. 24, 2020.

PCT Search Report dated Dec. 17, 2020 in connection with PCT Application No. PCT/CN2020/084211.

PCT Written Opinion dated Dec. 17, 2020 in connection with PCT Application No. PCT/CN2020/084211.

AT&T et al.; RAN1 UE features list for Rel-16; NR after RAN#100; 3GPP TSG RAN WG1 #100-c; R1-2001484; Mar. 6, 2020.

Wilus Inc.; On UCI enhancement and intra-UE prioritization/multiplexing for NR URLLC; 3GPP TSG RAN WG1 #98bis; R1-1911316; Nov. 26, 2019.

CATT; "Remaining issues on DL SPS enhancement"; 3GPP TSG RAN WG1 Meeting #100; R1-2000533; Feb. 24, 2020.

LG Electronics; "Outcome of email thread [100e-NR-L1enh_URLLC-SPS_enh-01]"; 3GPP TSG RAN WG1 #100; R1-2001382; Feb. 24, 2020.

LG Electronics; "Outcome of email thread [100e-NR-L1enh_URLLC-SPS_enh-02]"; 3GPP TSG RAN WG1 #100; R1-2001383; Feb. 24, 2020.

LG Electronics; "Outcome of email thread [100e-NR-L1enh_URLLC-SPS_enh-03]"; 3GPP TSG RAN WG1 #100; R1-2001384; Feb. 24, 2020.

3rd Generation Partnership Project; "Technical Specification Group Radio Access Network"; 3GPP TS 38.213 V16.0.0; Dec. 2019.

European Office Action dated Jul. 9, 2024 in connection with European Application Serial No. 20929911.4.

NTT Docomo, Inc.; Discussions on DL SPS enhancement; 7.2.6.7; Discussion and Decision; 3GPP TSG RAN WG1 #98bis; R1-1911182; Chongqing, China, Oct. 14-20, 2019.

* cited by examiner

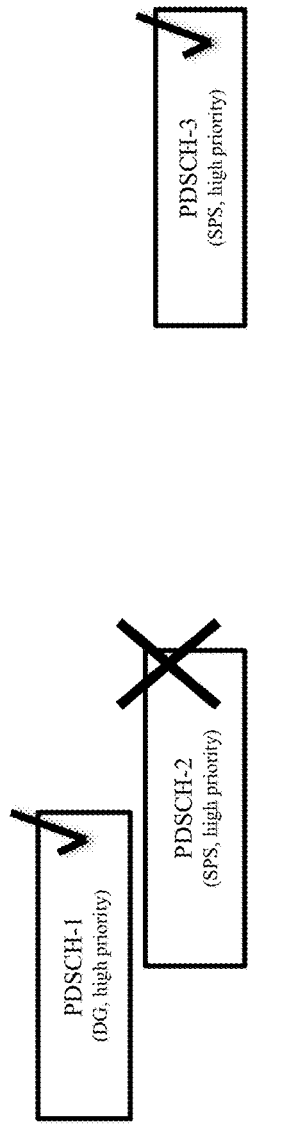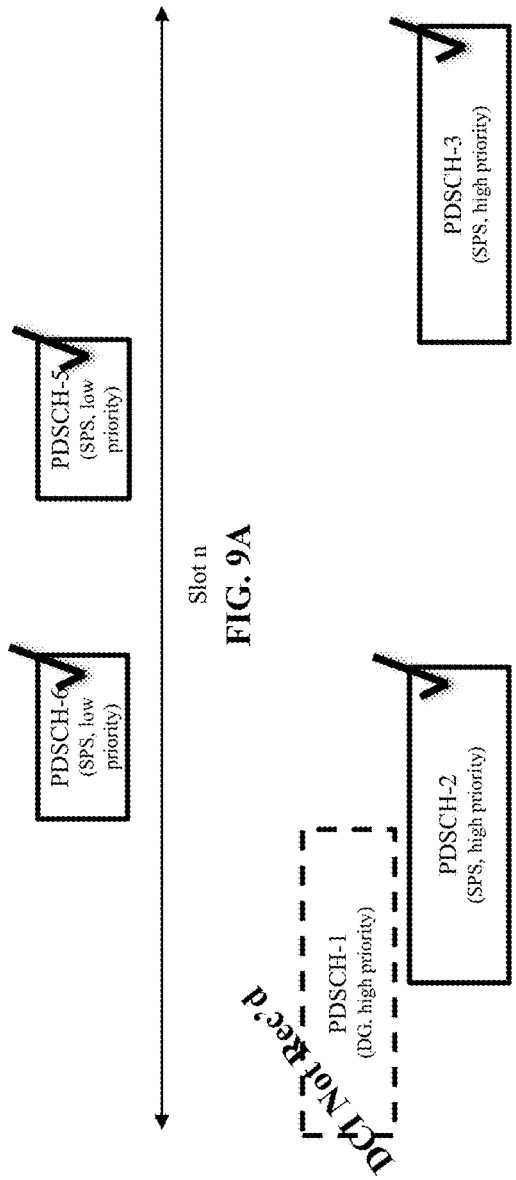
FIG. 9A
FIG. 9B

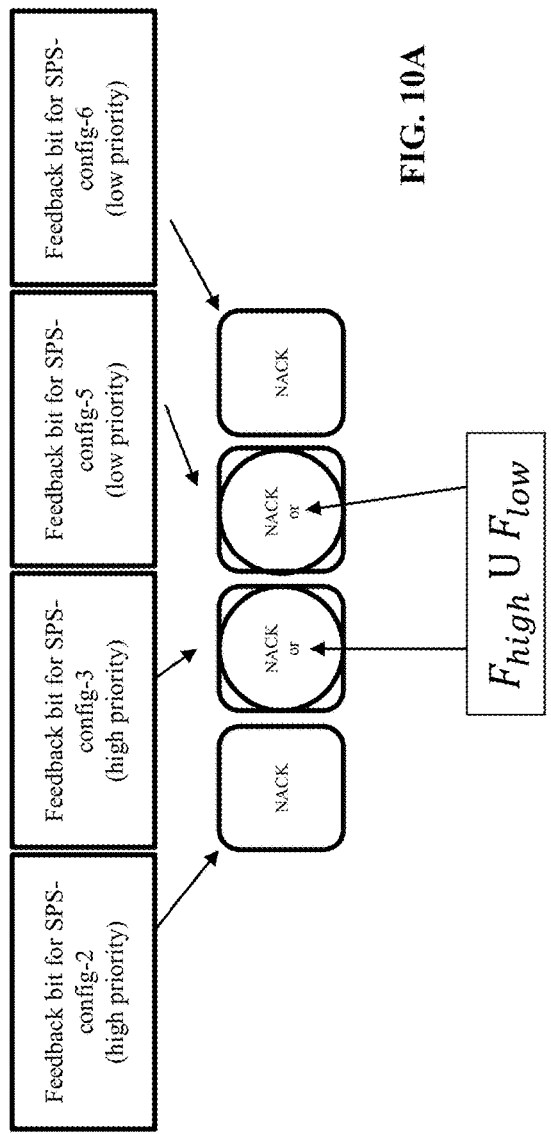
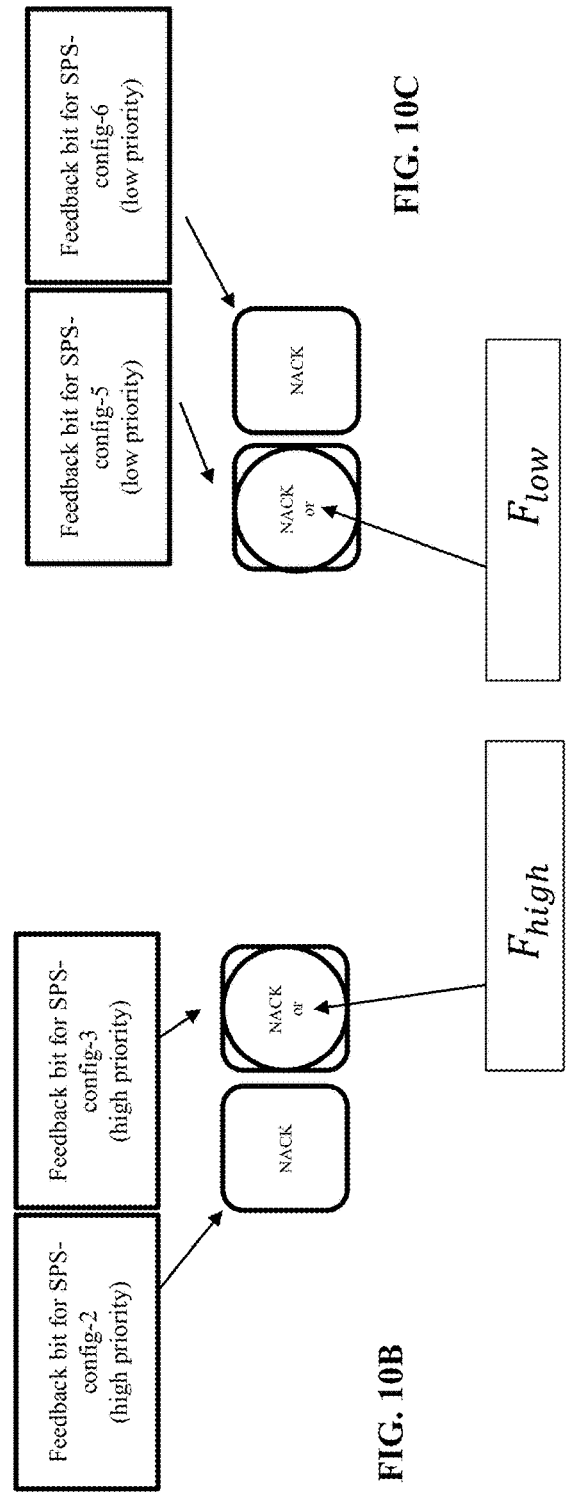
FIG. 10A
FIG. 10B
FIG. 10C

CODEBOOK DESIGN FOR SEMI-PERSISTENT SCHEDULING (SPS) TRANSMISSIONS

REFERENCE TO RELATED APPLICATIONS

This application is a National Phase entry application of International Patent Application No. PCT/CN2020/084211 filed Apr. 10, 2020, entitled "CODEBOOK DESIGN FOR SPS TRANSMISSIONS", the contents of which are herein incorporated by reference in their entirety.

BACKGROUND

In 5G New Radio systems, semi-persistent scheduling (SPS) allows multiple physical downlink shared channel (PDSCH) receptions to be scheduled in a single physical downlink control channel (PDCCH) transmission. Resource radio control messages are used to configure a pattern for use in SPS transmission and a single PDCCH is used to activate SPS transmission for several subsequent PDSCH receptions.

BRIEF DESCRIPTION OF THE DRAWINGS

Some examples of circuits, apparatuses and/or methods will be described in the following by way of example only. In this context, reference will be made to the accompanying Figures.

FIG. 1A is a block diagram illustrating an example wireless communication device configured to configure hybrid automatic repeat request (HARQ) feedback in SPS communication, according to various aspects disclosed.

FIGS. 9A and 9B illustrate a subset of the SPS PDSCH configurations of FIG. 4 that will selected as SPS PDSCH receptions based on example selection methods, according to various aspects disclosed.

FIG. 10A illustrates an example HARQ codebook construction, in accordance with various aspects disclosed.

FIG. 10B illustrates an example HARQ codebook construction, in accordance with various aspects disclosed.

FIG. 10C illustrates an example HARQ codebook construction, in accordance with various aspects disclosed.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
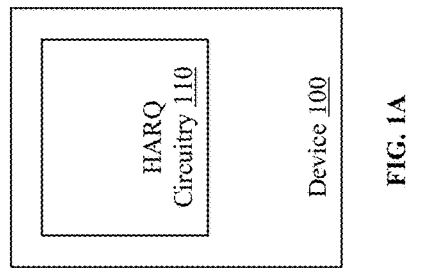
FIG. 1 is a block diagram illustrating an example wireless communication network, according to various aspects disclosed.
Figure 1:
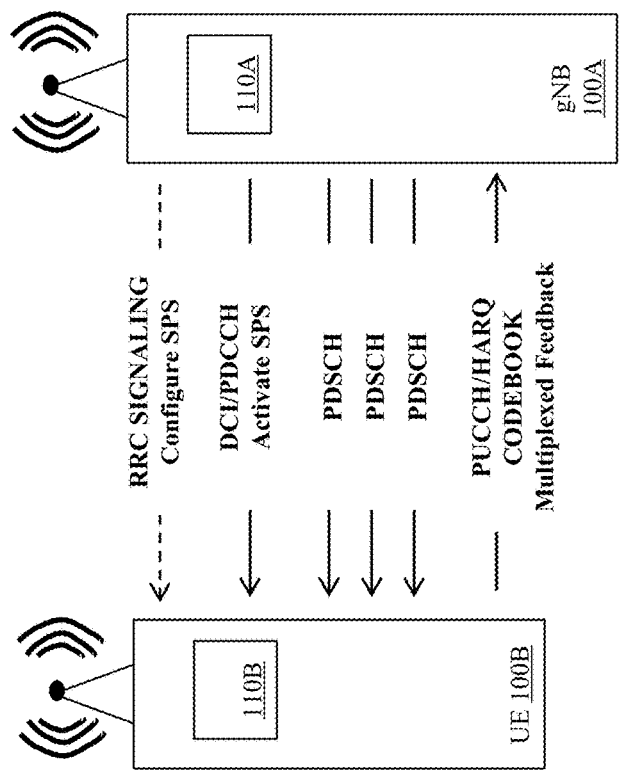

FIG. 1 illustrates a wireless network that includes a Next Generation NodeB (gNB)) 100A and a user equipment (UE) device 100B. As shown in FIG. 1A, the wireless communication devices 100A and 100B include HARQ circuitry 110 (e.g., a baseband processor or one or more processors) that is configured to cause the device to configure HARQ feedback between the UE and the gNB. In the following description, when a device 100 is described as performing some function, it is to be understood that the HARQ circuitry 110 is causing the device to perform the function. An example wireless communication device is illustrated in more detail in FIG. 13.

SPS allows the gNB to configure multiple PDSCH transmissions using a predetermined pattern so that separate PDCCH communication (e.g., downlink configuration information (DCI)) does not need to be transmitted for each PDSCH. When a UE enters the network, it signals a number of SPS PDSCH receptions per slot capability which, in one example, is either 1, 2, 4, or 7. RRC signaling is used by the gNB to configure the pattern(s) of resources that may be used in each slot for the SPS PDSCH. Not all of the configured resources are necessarily used in each slot. In some examples, it is possible that not all of component carriers (e.g., serving cells) are configured for SPS communication.

Once SPS is configured for the UE, the gNB activates SPS communication for subsequent PDSCH by transmitting a DCI carried in PDCCH. The DCI may include information about which SPS pattern will be used and identify a number of SPS PDSCH configurations, and so on. The UE provides feedback (e.g., ACK/NACK) by way of a HARQ codebook that includes feedback bits mapped to PDSCH configuration index values and component carriers in a manner prescribed by a codebook type. For example, in a Type 1 codebook the HARQ codebook includes a feedback bit for all component carriers while in a Type 2 codebook the HARQ codebook includes feedback bits only for component carriers having PDSCH configured for the given slot.

It is possible that configured SPS PDSCH may collide with other configured SPS PDSCH and/or dynamic grant (DG) PDSCH. When this occurs, the UE selects which of the PDSCH configurations to receive. For the purposes of this description SPS PDSCH configurations and DG PDSCH configurations that are selected by the UE to be received (e.g., decoded) are referred to as SPS PDSCH receptions and DG PDSCH receptions, respectively.

In order to construct the HARQ codebook for a given set of SPS PDSCH configurations, the UE first determines a number of PDSCH receptions for which feedback is to be provided in each slot. Then, based on this number and other considerations described herein, a codebook type is selected. The HARQ codebook is then constructed in the prescribed format with bits set for ACK and not set for NACK based on whether or not the PDSCH receptions were successfully received. The gNB makes similar analysis to be able to determine which PDSCHs will be received by the UE and use this information to interpret the received HARQ codebook.

In Release-16, a HARQ codebook design for SPS-only transmission is introduced. However, several issues remain open in the current specification. For example, the specification does not cover all aspects of UE capability in terms of unicast PDSCHs supported in a slot, interaction with downlink/uplink, overlapping and multiple SPS configurations in the same slot, overlapping with dynamic grant PDSCHs, high and low priority SPS PDSCH configurations, and so on.

Described herein are systems, methods, and circuitries for selecting amongst conflicting SPS PDSCHs and DG PDSCHs based on high and low priorities. The described systems, methods, and circuitries provide a robust mapping scheme for HARQ codebook construction that mitigates the effects of a missed DG PDSCH configuration. The proposed solution is extendable to Type 1 and Type 2 HARQ codebooks.

are 3 HARQ codebooks: SPS-only HARQ codebook that is introduced to handle HARQ feedback from multiple SPS configurations, Type 1 HARQ codebook, and Type 2 HARQ codebook. The Type 2 HARQ codebook incorporates the SPS-only HARQ codebook by reference. Some of the following discussion will be in the context of the SPS-only HARQ codebook. It is to be understood that the SPS-only HARQ codebook is part of the Type 2 HARQ codebook. Some selected procedures will extended for the Type 1 HARQ codebook.

A working assumption for HARQ feedback in the presence of multiple colliding SPS PDSCH configurations in a same slot is that the UE is not required to decode SPS PDSCH configurations other than the SPS PDSCH with the lowest configuration index among collided SPS PDSCH configurations. This means that the UE should report HARQ-ACK feedback only for SPS PDSCH configuration with the lowest configuration index among collided SPS PDSCH configurations.

Figure 2:
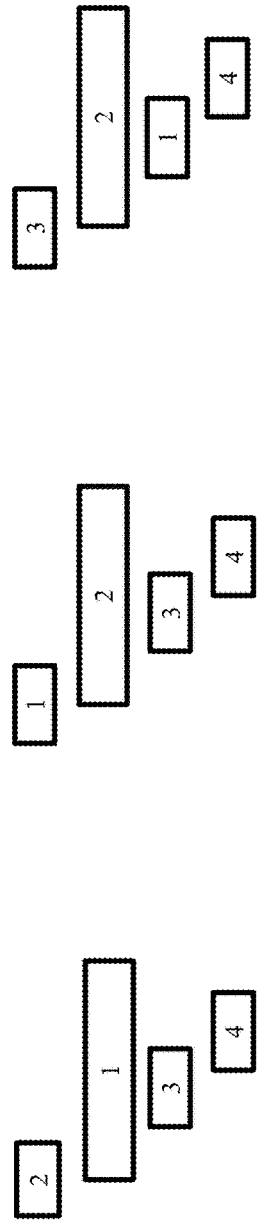
FIG. 2 illustrates three cases of overlapping SPS PDSCHs.

However, the definition of "collided" is not complete. For example, in FIG. 2 three cases of colliding PDSCH configurations are illustrated. It is uncertain under the present standard which of the PDSCH configurations should have feedback included in the HARQ codebook in Case B and Case C. Further, it is unclear how the UE is to handle DG PDSCH configurations that collide with SPS PDSCH configurations.

In Release-15, the fall-back mode is captured for the following cases: SPS release with DCI 1-0@C-DAI=1; DG @ PCell with DCI 1-0@C-DAI=1, and SPS reception for subsequent transmission after SPS activation. In Release-16, to support multiple SPS configurations on the same component carrier (CC), and also different CCs, a HARQ codebook for SPS receptions only is introduced. The SPS-only codebook includes pseudocode for SPS receptions only as follows below.

```
Set N_cells^DL to the number of serving cells configured to the UE
Set N_c^CSPS to the number of SPS PDSCH configurations that are configured to the UE for serving cell c
Set N_c^DL to the number of DL slots for SPS PDSCH receptions on serving cell c with HARQ-ACK
information multiplexed on the PUCCH
Set j = 0 HARQ-ACK information bit index
Set c = 0 serving cell index: lower indexes correspond to lower RRC indexes of corresponding cell
    while c < N_cells^DL
        Set s = 0 **SPS PDSCH configuration index: lower indexes correspond to lower RRC indexes of
corresponding SPS configurations**
            while s < N_c^SPS
                Set n_D = 0 slot index
                    while n_D < N_c^DL
                        if UE receives SPS PDSCH in slot n_D for SPS PDSCH configuration s on serving cell c
                            õ_j^ACK = HARQ-ACK Information bit for this SPS PDSCH reception
                            j = j + 1
                        end if
                        n_D = n_D + 1
                    end while
                s = s + 1
            end while
        c = c + 1
    end while
```

Figure 3:
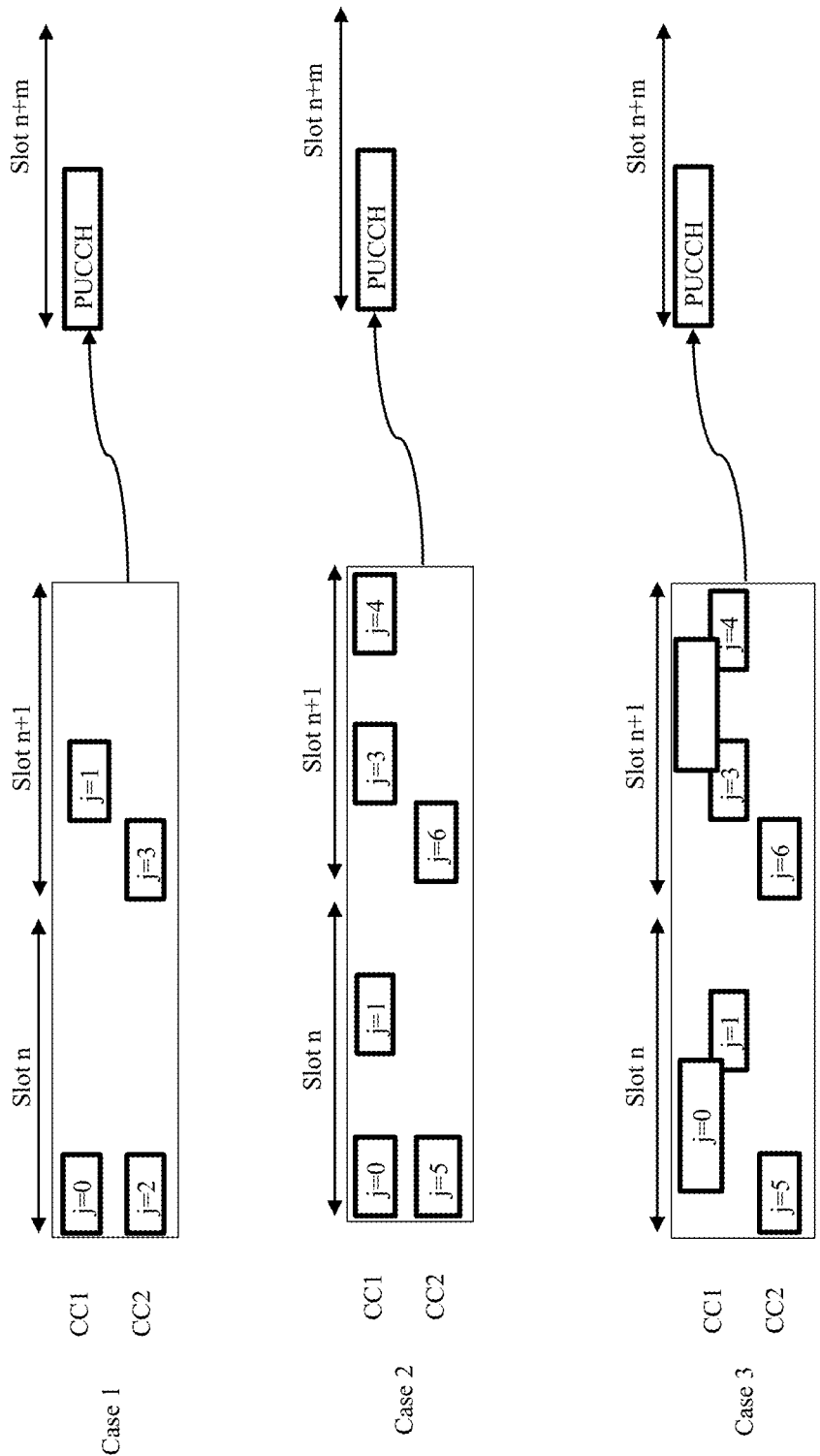
FIG. 3 illustrates three cases of overlapping SPS PDSCHs in which HARQ feedback occurs in a same physical uplink control channel (PUCCH) slot.

In Release-15, a Type 1 (i.e., semi-static) HARQ codebook and a Type 2 (i.e., dynamic) HARQ codebook are specified. Besides Type 1 and Type 2, there is also a "fall-back" mode for one bit feedback for a few cases, including SPS PDSCH only. In Release-16, to support multiple SPS configurations on a bandwidth part (BWP) (up to 8), the fall-back mode is expanded and a new SPS-only HARQ codebook is introduced. Hence from eURLLC, there FIG. 3 illustrates three different slot configurations in which HARQ feedback is provided for multiple SPS PDSCH receptions in the same PUCCH. In case 2 and case 3 multiple PDSCH configurations are received for the same CC in the same slot. It can be seen that the pseudocode above does not cover case 2 or case 3.

One proposed solution is for the UE to receive and decode one or more SPS PDSCH configurations within a group of overlapping SPS PDSCH configurations on the same serving cell according to the following procedure:

Step 0: set j=0 number of selected PDSCH for decoding
    set Q to the set of activated SPS PDSCH configurations in a slot Step 1: UE receives and decodes one of the SPS PDSCH configuration with the lowest configuration index within a group of overlapping SPS PDSCH configurations Q, set j=j+1

Step 2: The received/decoded SPS PDSCH and any other SPS PDSCH(s) overlapping, even partially, with at least one symbol of the PDSCHs are excluded from the group Q Step 3: Repeat step 1 and step 2 until the group is empty or j≥N Alternative solutions are described herein including how to select SPS PDSCH configurations for reception, how to construct the HARQ codebook, and how to map the selected SPS PDSCH receptions in the HARQ codebook. Design considerations include how to handle collision among SPS configurations, collision among SPS configuration and DG configurations, and non-overlapping SPS configurations in the same slot. The UE's processing capability (e.g., 1, 2, 4, or 7 unicast PDSCH per slot) should be taken into account to reduce codebook overhead. Overlapping or multiple SPS PDSCH configurations should be handled (e.g., case 2 and case 3 in FIG. 2) as well as interaction with DL/UL. High priority and low priority SPS configurations should be supported. This is because to support eMBB/uRLLC traffic mix, the priority of SPS configurations can be semi-statically configured. For example, on an active BWP, 3 SPS configurations are of high priority and 5 SPS configurations are of low priority. Among them, 2 out of 3 high priority SPS configurations are actually activated and 4 of the 5 low priority SOS configurations are actually activated. Reception of a low priority transmission should defer to reception of a high priority transmission and this should be reflected in the HARQ codebook construction.

Figure 4:
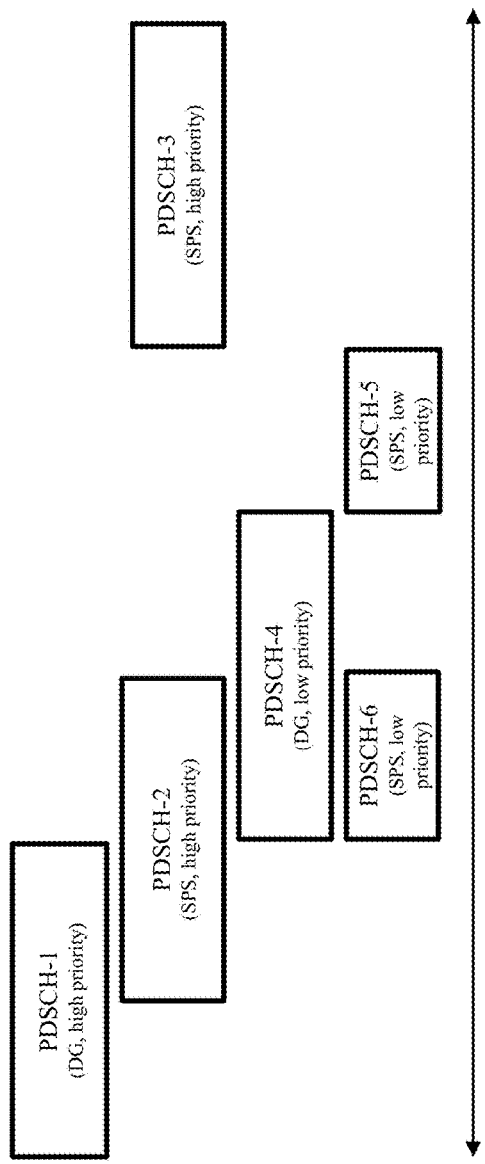
FIG. 4 illustrates six overlapping SPS PDSCH configurations in the same slot.
Figure 5:
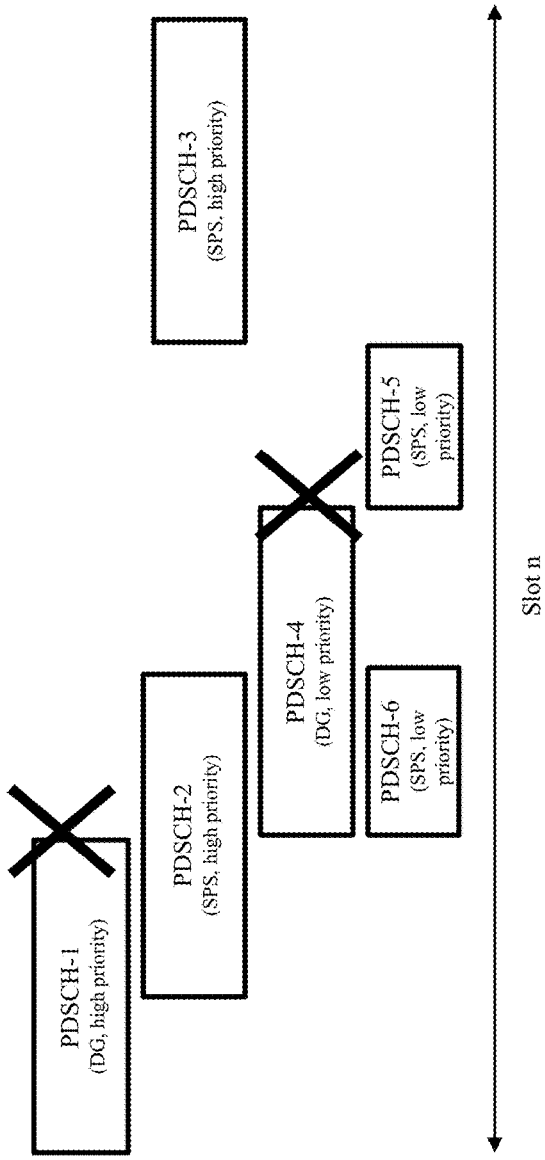
FIG. 5 illustrates a subset of the SPS PDSCH configurations of FIG. 4 that will selected as SPS PDSCH receptions based on a first example selection method, according to various aspects disclosed.

FIG. 4 illustrates a slot n in which 4 SPS PDSCH configurations are present as well as two DG PDSCH configurations. The case where there are SPS-only transmissions (e.g., no DG PDSCH) in a slot is considered first as illustrated in FIG. 5. A procedure for selecting high priority SPS PDSCH configurations (without considering DG PDSCH) for reception in a slot is outlined by the following pseudocode. This procedure is referred to herein as Procedure H.

---

Let N be the maximum number of unicast PDSCHs a UE is capable of receiving in a slot (i.e., N is derived from the UE's capability of receiving unicast PDSCHs in a slot).
Within a slot, applying the following rule for high priority SPS PDSCH configurations which are activated and have corresponding PDSCH transmissions in the slot:
    Let $L_{high}$ be the list of sorted SPS-configIndexes for high priority SPS configurations in the slot;
    First remove all the SPS-configIndexes from $L_{high}$ if their corresponding PDSCHs collide with any UL OFDM symbol;
    Initialize the following:
        Let S (the set of occupied OFDM symbols in the slot) be {null};
        Let C (the counter of chosen PDSCHs in the slot) be 0;
        Let $C_{high}$ (the counter of chosen high priority SPS PDSCHs in the slot) be {null};
        Let $F_{high}$ (the selected SPS-configIndex with a corresponding PDSCH reception in the slot) to be {null};
    Test SPS-configIndex in $L_{high}$, starting with the smallest SPS-configIndex until $L_{high}$ is exhausted and/or C == N:
        If the intersection of S and {OFDM symbols occupied by the PDSCH corresponding to the current SPS-configIndex} is null,
            the SPS PDSCH is chosen for reception, $F_{high} = F_{high} \cup$ {the current SPS-configIndex in $L_{high}$}
            S←S ∪ {OFDM symbols occupied by the PDSCH}; and C=C+1; $C_{high}=C_{high}+1$;
        End
    Let $S_{high} = S$

---

At the end of procedure H, $F_{high}$, $S_{high}$, and $C_{high}$ have been determined for high priority SPS PDSCH configurations.

A procedure for selecting low priority SPS PDSCH configurations (without considering DG PDSCH) for reception in a slot is outlined by the following pseudocode. This procedure is referred to herein as Procedure L.

---

Within a slot, applying the following rule for low priority SPS PDSCH configurations which are activated and have corresponding PDSCH transmissions in the slot:
    Let $L_{low}$ be the list of sorted SPS-config Indexes for low priority SPS configurations in the slot;
    First remove all the SPS-configIndexes from $L_{low}$ if their corresponding PDSCHs collide with any UL OFDM symbol;
    Initialize the following:
        Let $S = S_{high}$ (the set of occupied OFDM symbols including those occupied by high priority SPS PDSCH in the slot);
        Let $C_{low}$ (the counter of chosen low priority SPS PDSCHs in the slot) be 0;
        Let $F_{low}$ (the selected SPS-configIndex with a corresponding PDSCH reception in the slot) be {null};
    Test each SPS-configIndex in $L_{low}$, starting with the smallest SPS-configIndex until $L_{low}$ is exhausted and/or C==N:

```
If the intersection of S and {OFDM symbols occupied by the PDSCH corresponding to
the current SPS-configIndex} is null,
    the SPS PDSCH is chosen for reception, F_low = F_low ∪ {the current SPS-
    configIndex in L_low}
    S←S ∪ {OFDM symbols occupied by the corresponding PDSCH}; and C=C+1;
C_low=C_low+ 1,
End
Let S_low = S
```

At the end of procedure L, $F_{low}$, $S_{low}$, and $C_{low}$ have been determined for low priority SPS PDSCH configurations. Procedure H and Procedure L can be run in series to determine both high and low priority SPS PDSCH configurations that are selected for decoding (e.g., are identified as SPS PDSCH receptions). An overall set F of selected SPS PDSCH configurations is made by the union of $F_{high}$ and $F_{low}$.

A procedure for selecting SPS PDSCH configurations (without considering DG PDSCH) for reception in a slot is outlined by the following pseudocode. This procedure relies on the assumption that the gNB ensures that for two SPS configurations, say A and B, if A's SPS-configIndex is lower than B's SPS-configIndex, then A's priority is not lower than B's priority. This procedure is referred to herein as Procedure H+L.

```
Let N be the maximum number of unicast PDSCH a UE is capable of receiving in a slot (i.e., N is derived
from the UE's capability of receiving unicast PDSCHs in a slot).
Within a slot, applying the following rule for high priority and low priority SPS PDSCH configurations
which are activated and have corresponding PDSCH transmissions in the slot:
    Let L be the list of sorted SPS-configIndexes for SPS reception(s) in the slot;
    First remove all the SPS-configIndexes from L if their corresponding PDSCHs collide with
    any UL OFDM symbol;
    Initialize the following:
        Let S (the set of occupied OFDM symbols in the slot) be {null};
        Let C (the counter of chosen SPS PDSCHs in the slot) be 0;
        Let F (the selected SPS-configIndex with a corresponding PDSCH reception in the
        slot) be {null};
    Test each SPS-configIndex in L, starting with the smallest SPS-configIndex until L is
    exhausted and/or C==N:
        If the intersection of S and {OFDM symbols occupied by the PDSCH corresponding to
        the current SPS-configIndex} is null,
            the SPS PDSCH is chosen for reception, F = F ∪ {the current SPS-
            configIndex in L}
            S←S ∪ {OFDM symbols occupied by the corresponding PDSCH}; and C=C+1;
        End
```

At the end of procedure H+L, F, S, and C have been determined for SPS PDSCH configurations. These sets and quantities can be divided into high priority and low priority sets and quantities based on SPS-configIndex value to yield {$F_{high}$, $S_{high}$, and $C_{high}$} and ($F_{low}$, $S_{low}$, and $C_{low}$).

Figure 6:
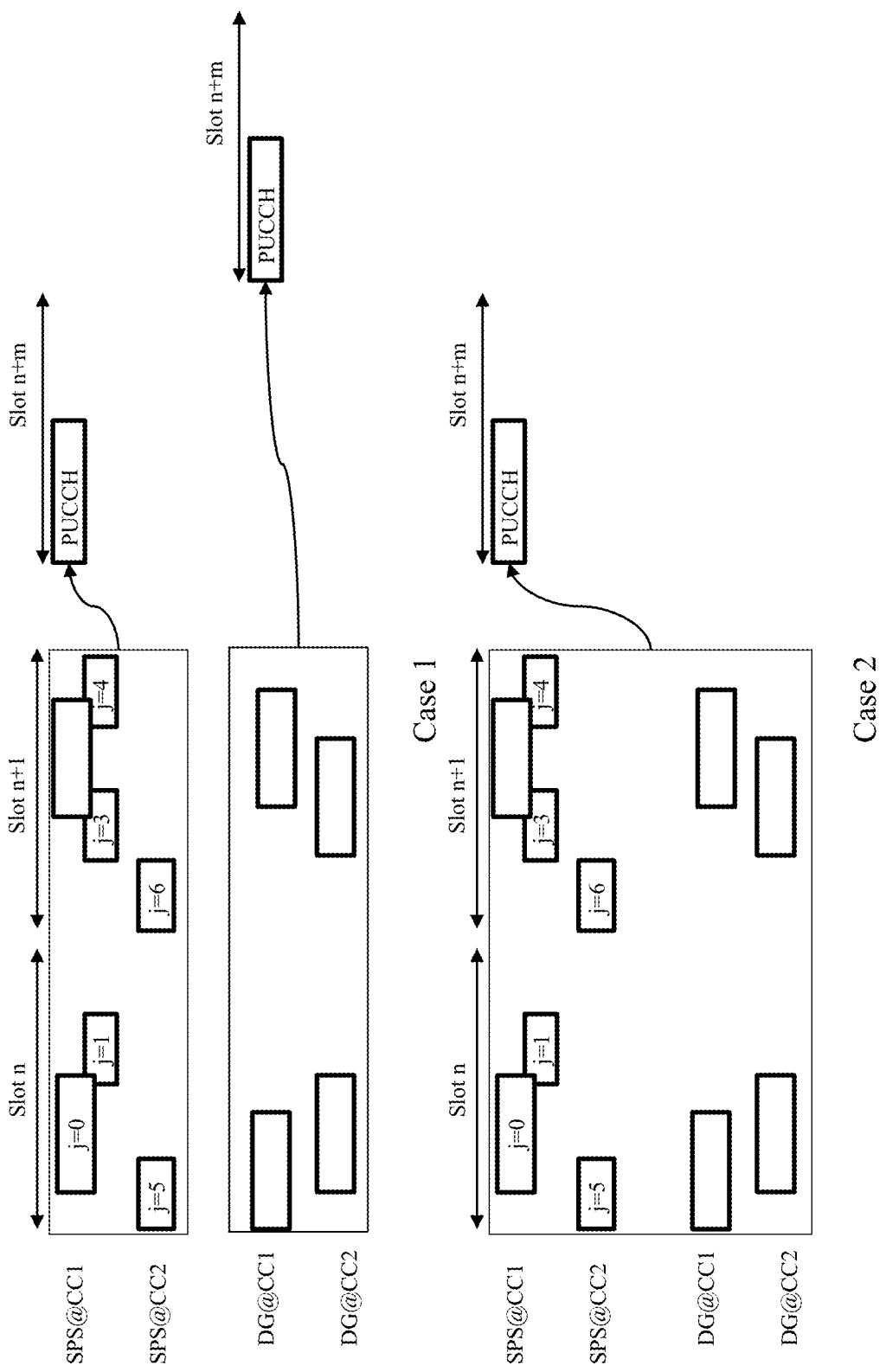
FIG. 6 illustrates two cases of overlapping SPS PDSCHs, one in which HARQ feedback occurs in a same physical uplink control channel (PUCCH) slot and one in which HARQ feedback occurs in a different PUCCH slot.

For a UE capable of receiving multiple unicast PDSCHs in a slot, there can be multiple PDSCHs from dynamic grants in addition to multiple SPS PDSCHs. Referring to FIG. 6 in case 1 the K1 values for SPS PDSCHs and DG PDSCHs could be different (otherwise the Type 1 or Type 2 codebook to multiplex DG PDSCH feedback with SPS PDSCH feedback should be used), so that the feedback does not occur on the same PUCCH. In case 2, SPS/DG PDSCH collisions may happen for HARQ feedback carried over Type 1 and Type 2 codebooks, where HARQ feedback for SPS and DG are sent to together on the same PUCCH.

Adaptations to Procedures H and L can be made to select, for reception, both DG PDSCHs and SPS PDSCHs in the same slot having feedback that occurs in the same slot. It is assumed that through gNB scheduling no DG PDSCH collisions occur. The main adaptation is that in Procedure H the set S of occupied symbols is initialized with OFDM symbols occupied by high priority DG PDSCHs and, in some examples, also low priority DG PDSCHs.

Figure 7:
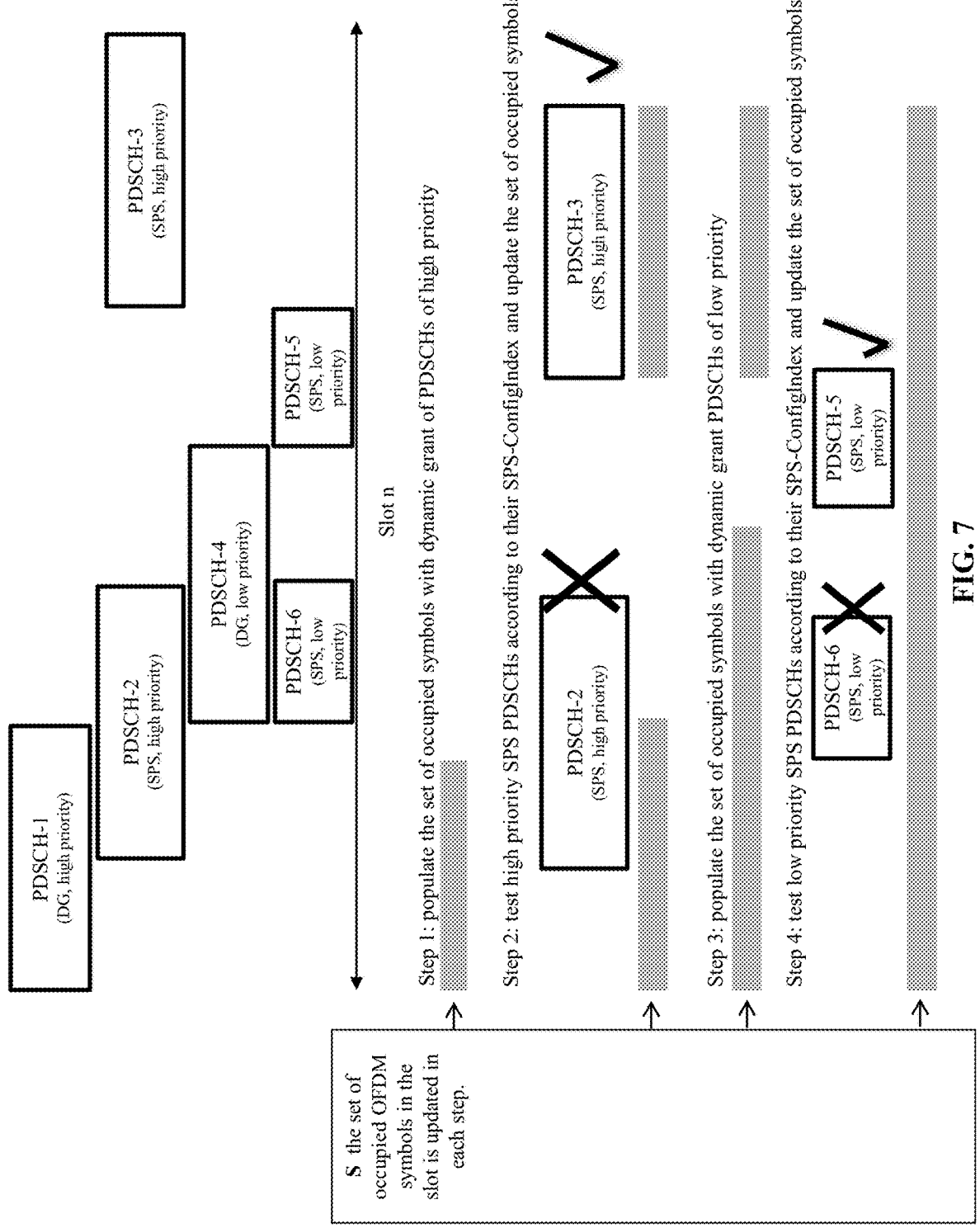
FIG. 7 illustrates a subset of dynamic grant (DG) PDSCH configurations and SPS PDSCHs configurations that will selected as DG PDSCH receptions and SPS PDSCH receptions, respectively, based on a first example selection method, according to various aspects disclosed.

FIG. 7 illustrates a first example adaptation of Procedure H and Procedure L to handle DG PDSCH and SPS PDSCH collisions. Procedure H is modified as follows:

S' is the set of OFDM symbols occupied by high priority DG PDSCHs
    Replace the initialization of S={null} to S=S' (Step 1)
    Replace the initialization of C=0 to C=number of high priority DG PDSCHs
    Run pseudocode for Procedure H with the modified S and C (Step 2)
    The output is $S_{high}$ and $C_{high}$
Procedure L is modified as follows:

S" is the set of OFDM symbols occupied by low priority DG PDSCHs
    Replace the initialization of S=$S_{high}$ to S=$S_{high}$∪S" (Step 3)
    To account for low priority PDSCHs in the UE's capability of receiving multiple unicast PDSCHs in a slot, introduce the initialization step C=C+number of low priority DG PDSCHs
    Run pseudocode for Procedure L with the modified S and C (Step 4)
    The output is S and C.

Figure 8:
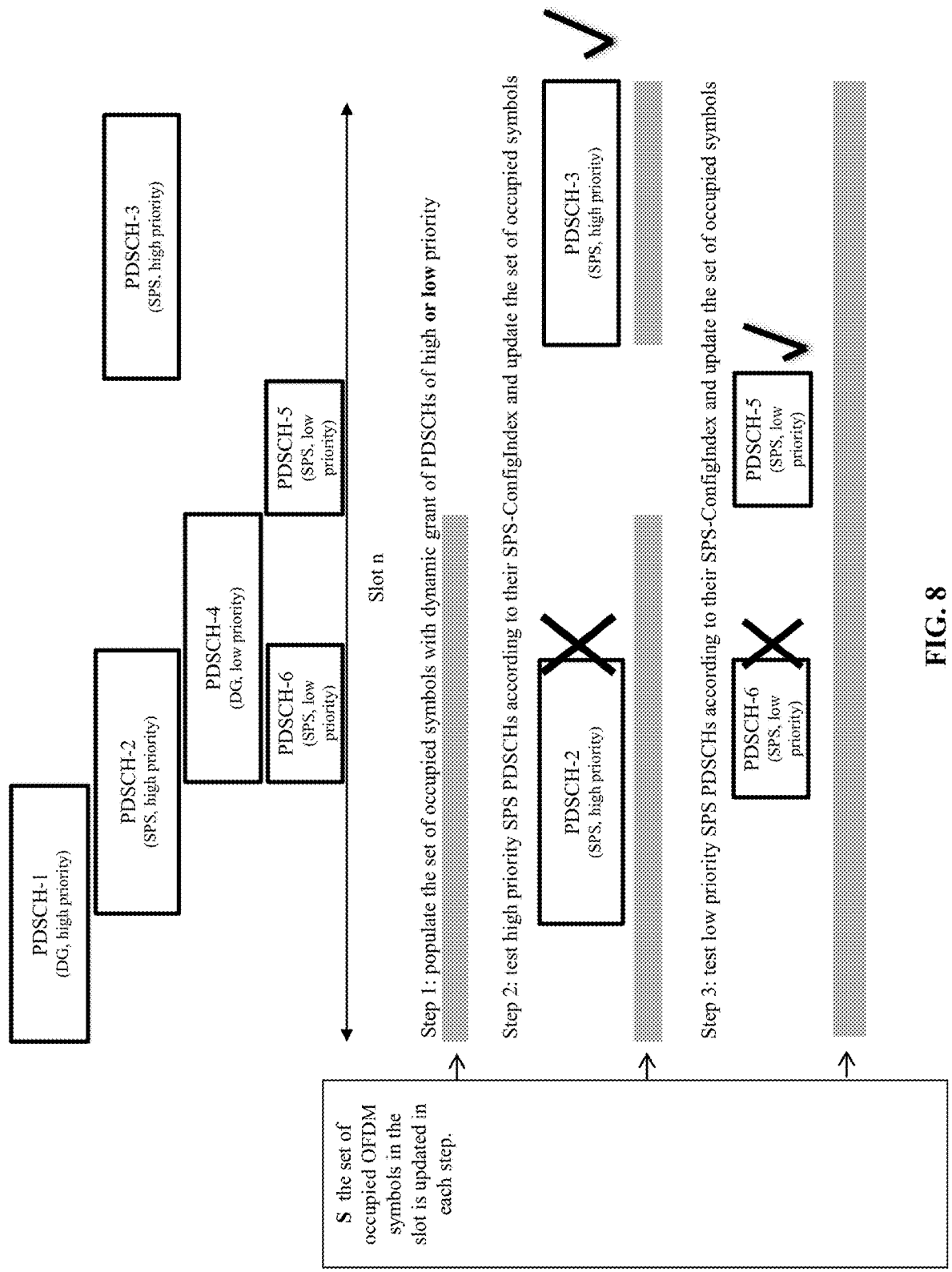
FIG. 8 illustrates a subset of dynamic grant (DG) PDSCH configurations and SPS PDSCHs configurations that will selected as DG PDSCH receptions and SPS PDSCH receptions, respectively, based on a second example selection method, according to various aspects disclosed.

FIG. 8 illustrates a second example adaptation of Procedure H and Procedure L to handle DG PDSCH and SPS PDSCH collisions. Procedure H is modified as follows:

S' is the set of OFDM symbols occupied by high priority and low priority DG PDSCHs
    Replace the initialization of S={null} to S=S' (Step 1)
    Replace the initialization of C=0 to C=number of high priority DG PDSCHs
    Run pseudocode for Procedure H with the modified S and C (Step 2)

The output is $S_{high}$ and $C_{high}$

Procedure L is modified as follows:

Keep the initialization of $S=S_{high}$

To account for low priority PDSCHs in the UE's capability of receiving multiple unicast PDSCHs in a slot, introduce the initialization step C=C+number of low priority DG PDSCHs Run pseudocode for Procedure L with the modified S and C (Step 3)

The output is S and C.

A third example adaptation of Procedure H and Procedure L is as follows:

S' is the set of OFDM symbols occupied by DG PDSCHs

Replace the initialization of S={null} to S=S' (Step 1)

Replace the initialization of C=0 to C=number of DG PDSCHs

Run pseudocode for Procedure H and Procedure L with the modified S and C (Step 2)

The output is S and C.

FIGS. 9A and 9B illustrate a potential ambiguity with the methods outlined in FIGS. 7 and 8. This ambiguity is caused by the fact that the SPS PDSCHs that are chosen for reception may be different (even for those that are not overlapping with a DG PDSCH) depending on whether the DCIs for the DC PDSCH have been received successfully or not. In FIG. 9A, the DCI for PDSCH-1 is received and the UE would receive PDSCH-1, PDSCH-5, PDSCH-6. In FIG. 9B, the DCI for the PDSCH-1 is not received and the UE would receive PDSCH-2, PDSCH-3, PDSCH-5. There is no common understanding between the gNB and UE as to whether PDSCH-6 is received or not, which creates a problem for the gNB that it does not know whether it can transmit anything using PDSCH-6 or not.

One way to address this ambiguity is to resolve the SPS PDSCH collisions first, and then resolve the collision between SPS PDSCH and DG PDSCH. An example adaptation of Procedure H and Procedure L that first resolves SPS PDSCH collisions and then resolves the SPS and DG collisions is as follows:

Step 1: First resolve the collisions among SPS PDSCH configurations. An example of resolving collisions among SPS PDSCH without considering DG PDSCHs is illustrated above with reference to FIGS. 4 and 5. This step yields sets of SPS PDSCHs $F_{high}$ and $F_{low}$.

Step 2: For each high priority DG PDSCH, the DG PDSCH is received by the UE, and:

If the DG PDSCH overlaps with one or more SPS PDSCH in $F_{high}$ and $F_{low}$, the overlapping SPS PDSCH(s) are removed from $F_{high}$ and $F_{low}$ (e.g., they are not selected for reception by the UE.

Else if the total number of received PDSCHs including this PDSCH>N, the SPS PDSCH configuration with configuration index in $F_{low}$ (if non-empty) or Frio (if $F_{low}$ is empty) is removed from the set, and is not received by the UE.

Step 3: For each low priority DG PDSCH:

If the total number of received PDSCHs including this DG PDSCH>N:

If $F_{low}$ is non-empty, the SPS PDSCH configuration with the lowest configuration index is removed from Flow.

The low priority DG PDSCH is received.

Else, the low priority DG PDSCH is not received.

Else the low-priority DG PDSCH is received.

An example adaptation of Procedure H+L that first resolves SPS PDSCH collisions and then resolves the SPS and DG collisions is as follows:

Step 1: First resolve the collisions among SPS PDSCH configurations. An example of resolving collisions among SPS PDSCH without considering DG PDSCHs is illustrated above with reference to FIGS. 4 and 5. This step yields sets of SPS PDSCHs F.

Step 2: For each DG PDSCH, the DG PDSCH is received by the UE, and:

If the DG PDSCH overlaps with one or more SPS PDSCH in F, the overlapping SPS PDSCH(s) are removed from F (e.g., they are not selected for reception by the UE.

Else if the total number of received PDSCHs including this PDSCH>N, the SPS PDSCH configuration with configuration index in F is removed from the set, and is not received by the UE.

Once the UE has determined which DG and SPS PDSCHs to receive, a codebook is selected. When the Procedure H and Procedure L are used an example codebook selection proceeds as follows:

---

Let C be the set of component carriers configured for SPS reception only HARQ codebook, each of the component carriers having an active BWP (i.e., if it is an SCell, it is activated, not inactive or in dormancy).

For PUCCH resource at slot n for the SPS reception only HARQ codebook,

Identify all the $F_{high,k,c}$ and $F_{low,k,c}$ for slot n-k, $k \in K_1$, set at CC $c \in C$ (the component carriers configured for HARQ feedback at the PUCCH resource), If there is no dynamic grant PDSCH (including SPS activation) or SPS release in any slot n – k, $k \in K_1$, at any CC c, Then (the condition to apply the SPS-only HARQ codebook is valid)

utilize $F_{high}$ and $F_{low}$ to construct the SPS-only HARQ codebook;

(In TS 38.213, the current specification does not differentiate different priorities when constructing SPS-only HARQ codebook, hence in addition to constructing the SPS-only HARQ codebook with both $F_{high,k,c}$ and $F_{low,k,c}$, $k \in K_1$, $c \in C$; differentiation in the physical layer priority is also possible);

Else (the condition to apply the SPS-only codebook is invalid)

If priority level is not configured,

Generate Type 1 or Type 2 codebook with $F_{high,k,c}$ and $F_{low,k,c}$, and dynamic grant PDSCHs (including SPS activation), SPS release for $k \in K_1$, $c \in C$;

Else

For high priority HARQ feedback:

Generate Type 1 or Type 2 codebook with $F_{high,k,c}$ and dynamic grant PDSCHs (including SPS activation) of high priority, SPS release for high priority SPS, for $k \in K_1$, $c \in C$;

For low priority HARQ feedback:

Generate Type 1 or Type 2 codebook with $F_{low,k,c}$ and dynamic grant PDSCHs (including SPS activation) of low priority, SPS release for low priority SPS, for $k \in K_1$, $c \in C$;

-continued

For PDSCH scheduled by the fall-back DCI Format 1_0, the HARQ
feedback can be included in the high priority HARQ feedback or low priority HARQ
feedback through specification;
    End
End When the Procedure H+L is used an example codebook
selection proceeds as follows:

Let C be the set of component carriers configured for SPS reception only HARQ
codebook, each of the component carriers having an active BWP (i.e., if it is an SCell, it
is activated, not inactive or in dormancy).
For PUCCH resource at slot n for the SPS reception only HARQ codebook,
    Identify all the $F_{k,c}$ for slot n-k, k ∈ $K_1$ set at CC c ∈ C (the component carriers
configured for HARQ feedback at the PUCCH resource),
    If there is no dynamic grant PDSCH (including SPS activation) or SPS
release in any slot n − k, k ∈ $K_1$, at any CC c,
        Then (the condition to apply the SPS-only HARQ codebook is valid)
            utilize $F_{k,c}$ to construct the SPS-only HARQ codebook;
    (In TS 38.213, the current specification does not differentiate different
priorities when constructing SPS-only HARQ codebook, hence in addition to
constructing the SPS-only HARQ codebook with $F_{k,c}$, k ∈ $K_1$, c ∈ C, but differentiation in
the physical layer priority is also possible);
        Else (the condition to apply the SPS-only codebook is invalid)
        If priority level is not configured,
            Generate Type 1 or Type 2 codebook with $F_{k,c}$ and dynamic grant
PDSCHs (including SPS activation), SPS release for k ∈ $K_1$, c ∈ C
        Else
            For high priority HARQ feedback:
                Generate Type 1 or Type 2 codebook with $F_{high,k,c}$ and
dynamic grant PDSCHs (including SPS activation) of high priority, SPS release for high
priority SPS, for k ∈ $K_1$, c ∈ C;
            For low priority HARQ feedback:
                Generate Type 1 or Type 2 codebook with $F_{low,k,c}$ and
dynamic grant PDSCHs (including SPS activation) of low priority, SPS release for low
priority SPS, for k ∈ $K_1$, c ∈ C;
            For PDSCH scheduled by the fall-back DCI Format 1_0, the HARQ
feedback can be included in the high priority HARQ feedback or low priority HARQ
feedback through specification;
    End
End Once a codebook type is selected, the codebook is constructed. It is noted that Release-16 Type 2 codebook includes the SPS-only codebook by reference so the following proposed solutions can be used to revise the Release-16 Type 2 codebook design also.

In one example, it is assumed that there is no error in receiving dynamic grants from the gNB. This means the UE may use $F_{high}$ to decide what SPS PDSCH will be received in a slot, within the high priority HARQ codebook, and the HARQ codebook size for the slot on a CC is determined by $F_{high}$. Likewise the UE may use $F_{low}$ to decide what SPS PDSCH will be received in a slot, within the low priority HARQ codebook, and the HARQ codebook size for the slot on a CC is determined by $F_{low}$.

If a UE misses a DG in a slot, the cardinality of $F_{high}$ and/or $F_{low}$, or the selected SPS PDSCH could be wrong even though the cardinality of $F_{high}$ and/or $F_{low}$ may still be correct. In this case, the effects of the error should be limited so any missed DG should at most affect the HARQ feedback for that particular CC and slot and not cascade to other CCs and/or slots. To avoid such error propagation, in one example, a fixed feedback size is used for a given slot at a given CC in one of the following ways.

In a first option, the feedback size for a given slot/CC is determined by the number of SPS PDSCH configurations which may or may not be activated. In a second option, the feedback size for a given slot/CC is determined by the number of SPS PDSCH configurations which are active in the slot. FIG. 10A refers to the slot configuration illustrated in FIG. 7 and illustrates the second option when priority is not differentiated in the SPS-only codebook. The feedback size for a given slot/CC is determined by the number of SPS PDSCH configurations which are active in the slot (four) and the HARQ ACK bits for the SPS PDSCH receptions from $F_{high} \cup F_{low}$ are mapped to their respective location while unmapped (not received) locations are populated with NACK.

FIG. 10B refers to the slot configuration illustrated in FIG. 7 and illustrates the second option for high priority. The feedback size for a given slot/CC is determined by the number of high priority SPS PDSCH configurations which are active in the slot (two) and the HARQ ACK bits for the SPS PDSCH receptions from $F_{high}$ are mapped to their respective location while unmapped (not received) locations are populated with NACK. FIG. 10C refers to the slot configuration illustrated in FIG. 7 and illustrates the second option for low priority. The feedback size for a given slot/CC is determined by the number of low priority SPS PDSCH configurations which are active in the slot (two) and the HARQ ACK bits for the SPS PDSCH receptions from $F_{low}$ are mapped to their respective location while unmapped (not received) locations are populated with NACK.

Figure 11:
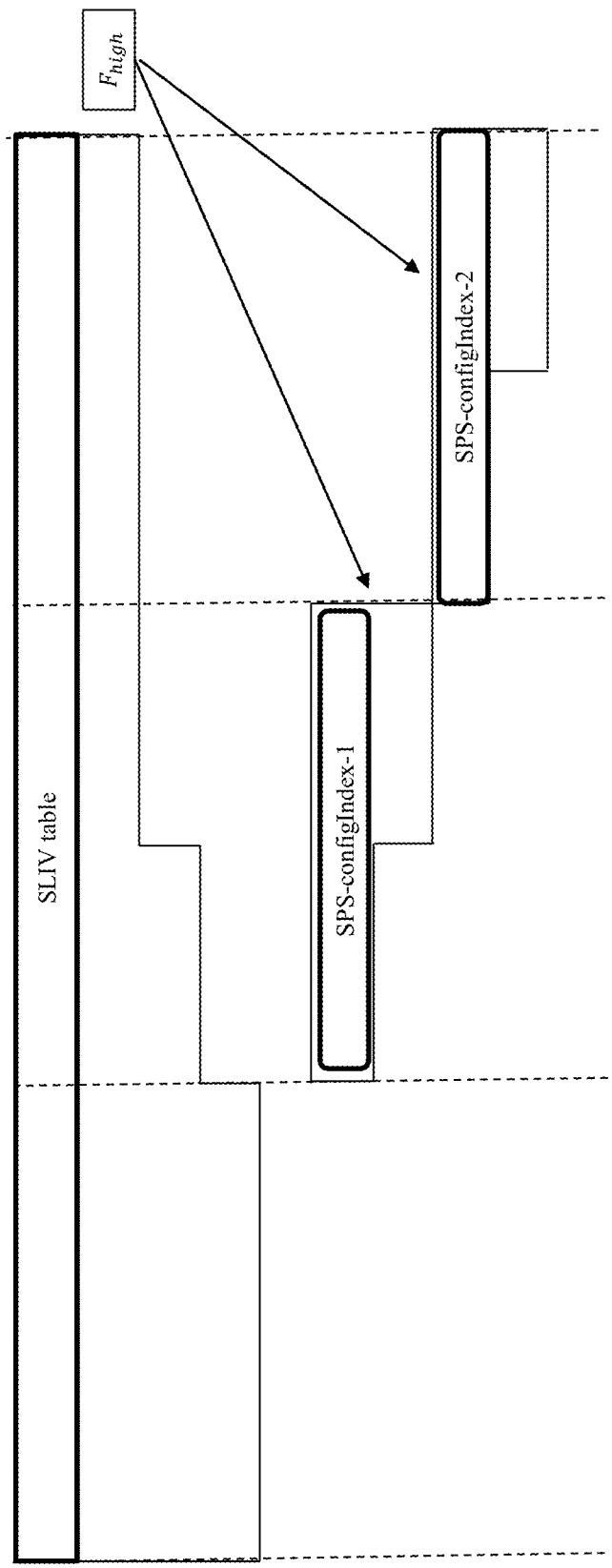
FIG. 11 illustrates an example start and length index value (SLIV) table segmented for use in constructing a HARQ codebook, in accordance with various aspects disclosed.

Referring to FIG. 11, in a third option, for a slot on a CC with one or more SPS PDSCH configurations, the feedback size is determined by the number of bits from a SLIV table decomposition from the Release-15 Type 1 codebook. If there is no SPS PDSCH configuration present on a slot on a CC, no feedback bits are budgeted. In the pseudocode of the Type 1 codebook in the Release-15 specification, to determine the number of feedback bits, a pseudocode is executed to divide the SLIV table into multiple parts as shown in FIG. 11. The following procedure may be used to map from $F_{high}$ to the feedback bits from the SLIV table decomposition (the design for low priority can be similarly derived). For an SPS-Index in $F_{high}$, an SLIV is derived for the corresponding PDSCH and that HARQ feedback bit's position is determined by the position of the SLIV segments in the SLIV table decomposition. In the example of FIG. 11 fort the given slot/CC, the feedback includes 3 bits [NACK, HARQ-ACK for SPS-configIndex-1, HARQ-ACK for SPS-config-Index-2]. The first feedback bit is NACK because the first segment is not mapped with any SPS-configIndex in $F_{high}$.

It may be simpler to encode SPS PDSCH receptions irrespective of their priorities. In other words, the SPS-only codebook can include HARQ feedback for all SPS configuration irrespective of their priorities. In this case, the following procedure may be used to map from $F_{high} \cup F_{low}$ to the feedback bits from the SLIV table decomposition. For an SPS-Index in $F_{high} \cup F_{low}$, an SLIV is derived for the corresponding PDSCH and that HARQ feedback bit's position is determined by the position of the SLIV segments in the SLIV table decomposition.

In a fourth option, the feedback size is the smaller one between the number of SPS PDSCH configurations which are active in the slot (option 2) and the number of bits from the SLIV table decomposition (option 3).

In a fifth option, the feedback size for a given slot/CC is determined by the number of SPS PDSCH receptions as determined using the methods outlined above with reference to FIGS. 9A and 9B above. In this manner the feedback size is not affected by whether a DG PDSCH is missed.

In Release-15, in the Type 2 codebook a single feedback bit for SPS reception is appended to other feedback bits. In Release-16, TS 39.213 is revised so in the Type 2 codebook, feedback bits for SPS PDSCH reception are appended to other feedback bits and the feedback bits for SPS PDSCH reception follow the procedure for the SPS-only codebook construction.

For the Type 1 codebook construction, the third option (FIG. 11) can be extended to the case where SPS PDSCH reception, DG PDSCH reception, SPS release feedback are multiplexed in the same HARQ codebook. Thus the SPS PDSCH configuration selection procedure outline above is executed and then feedback bits are mapped according to the SLIV table decomposition for $F_{high}$ and high priority DG PDSCHs (or $F_{low}$ and low priority DG PDSCHs).

Following are one or more flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein the term generate, when used with reference to a signal, should be construed broadly as encompassing any manner of calculating, computing, selecting from amongst stored signal options, or otherwise determining a signal using a processor and processing the signal for communication to another device.

Figure 12:
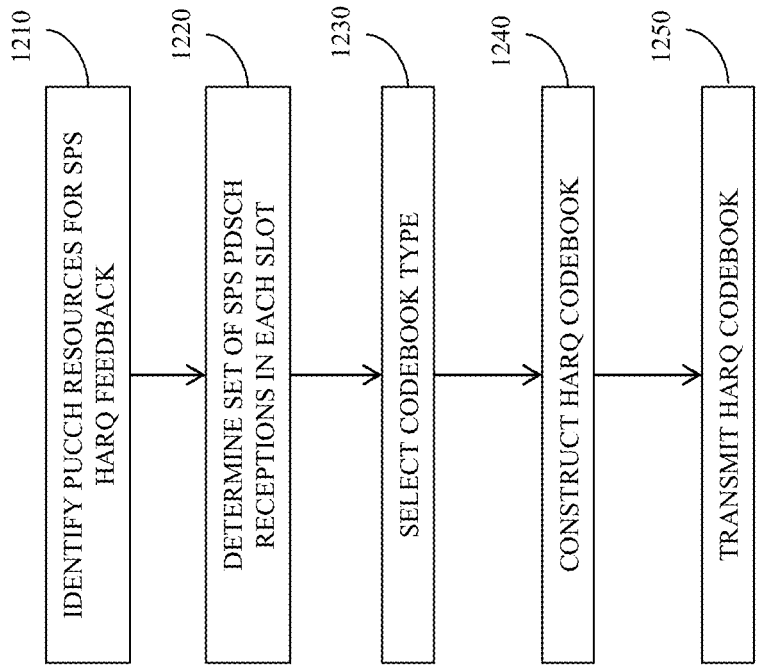
FIG. 12 is a flow diagram outlining an example method of constructing a HARQ codebook for SPS communication, in accordance with various aspects disclosed.

FIG. 12 depicts a flow diagram outlining a method 1200, for a UE device receiving SPS PDSCHs to provide HARQ feedback. The method includes, at 1210, identifying a physical uplink control channel (PUCCH) resource in a first slot for communicating a hybrid automatic repeat request (HARQ) codebook that provides feedback about semi-persistent scheduling (SPS) physical downlink shared channel (PDSCH) receptions in a plurality of slots that precede or include the first slot. The method includes, at 1220, determining a set of SPS PDSCH receptions for which feedback is multiplexed in the HARQ codebook based SPS PDSCH configurations for each component carrier and each of the plurality of slots, a UE capability for number of SPS PDSCH receptions per slot, and a prioritization protocol. The method includes, at 1230, selecting a codebook type based on whether a PDSCH is scheduled by way of a dynamic grant for any of the plurality of slots. The method includes, at 1240, constructing the HARQ codebook based on the set of SPS PDSCH receptions and the selected codebook type. The method includes, at 1250, transmitting the HARQ codebook to a next generation node B (gNB).

Figure 13:
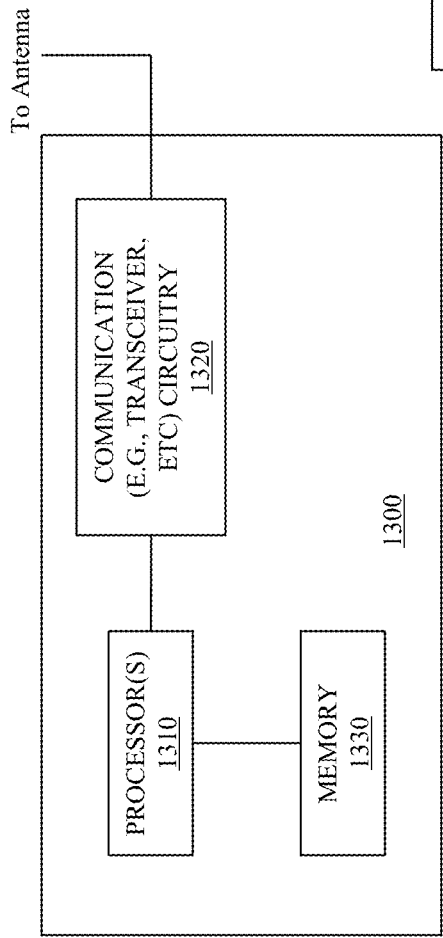
FIG. 13 illustrates a simplified block diagram of a user equipment wireless communication device, in accordance with various aspects described.

Referring to FIG. 13, illustrated is a block diagram of a user equipment wireless communication device (UE) configured to perform SPS communication, according to various aspects described herein. The UE device 1300 includes one or more processors 1310 (e.g., one or more baseband processors) comprising processing circuitry and associated interface(s), transceiver circuitry 1320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1330 (which can comprise any of a variety of storage mediums and can store instructions and/or data associated with one or more of processor(s) 1310 or transceiver circuitry 1320).

In various aspects discussed herein, signals and/or messages can be generated and output for transmission, and/or transmitted messages can be received and processed. Depending on the type of signal or message generated, outputting for transmission (e.g., by processor(s) 1310, processor(s) 1310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), polar code, etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 1310) can comprise one or more of: identifying physical resources associated with the signal/message, detecting the signal/message, resource element group de-interleaving, demodulation, descrambling, and/or decoding.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a wireless communication device (device) serving as a user equipment (UE) node in a wireless network, including one or more processors configured to cause the device to: identify a physical uplink control channel (PUCCH) resource in a slot for communicating a hybrid automatic repeat request (HARQ) codebook that provides feedback about semi-persistent scheduling (SPS) physical downlink shared channel (PDSCH) receptions in a plurality of slots that precede or include the slot; determine a set of SPS PDSCH receptions for which feedback is multiplexed in the HARQ codebook based on SPS PDSCH configurations for each component carrier and each of the plurality of slots, a UE capability for number of SPS PDSCH receptions per slot (N), and a prioritization protocol; select a codebook type based on whether a PDSCH is scheduled by way of a dynamic grant for any of the plurality of slots; construct the HARQ codebook based on the set of SPS PDSCH receptions and the selected codebook type; and transmit the HARQ codebook to a next generation node B (gNB).

Example 2 includes the subject matter of example 1, including or omitting optional elements, wherein the one or more processors are configured to cause the device to: determine the set of SPS PDSCH receptions for which feedback is multiplexed in the HARQ codebook by, for each of the plurality of slots and each component carrier configured for SPS communication with the UE: identifying a plurality of SPS PDSCH configurations for the slot and the component carrier; selecting zero or more SPS PDSCH configurations as SPS PDSCH receptions based on the UE capability for number of SPS PDSCH receptions per slot and the prioritization protocol; and adding the SPS PDSCH receptions to the set of SPS PDSCH receptions.

Example 3 includes the subject matter of example 2, including or omitting optional elements, wherein the one or more processors are configured to cause the device to determine the set F of SPS PDSCH receptions by: identifying a set $L_{high}$ that includes high priority SPS PDSCH configurations for the slot for all configured component carriers, wherein each high priority SPS PDSCH configuration is assigned an index value; removing high priority SPS PDSCH configurations that collide with an uplink symbol from the set $L_{high}$; initializing a set S of occupied symbols in the slot to be null; initializing a counter C of SPS PDSCH configurations selected as high priority SPS PDSCH receptions to zero; initializing a counter $C_{high}$ of high priority SPS PDSCH configurations selected as high priority SPS PDSCH receptions to zero; initializing a set $F_{high}$ of high priority SPS PDSCH configuration index values having corresponding PDSCH selected as high priority SPS PDSCH receptions to null; until C is equal to the UE capability for number of SPS PDSCH receptions per slot or all high priority SPS PDSCH configurations in the set $L_{high}$ are considered: identify a high priority SPS PDSCH configuration in the set $L_{high}$ having a lowest configuration index value; determine if the high priority SPS PDSCH configuration includes a symbol in set S; when the high priority SPS PDSCH configuration does not include a symbol in set S: add the SPS PDSCH configuration index value to the set $F_{high}$; increment the counter C and the counter $C_{high}$; and add symbols occupied by the SPS PDSCH configuration to the set S, wherein the set F includes $F_{high}$.

Example 4 includes the subject matter of example 3, including or omitting optional elements, wherein the one or more processors are configured to cause the device to: initialize the set S of occupied symbols to include symbols occupied by high priority dynamic grant PDSCH configurations in the plurality of slots; and initialize the set C to a number of high priority dynamic grant PDSCH configurations the UE is capable of receiving in a slot.

Example 5 includes the subject matter of example 4, including or omitting optional elements, wherein the one or more processors are configured to cause the device to: initialize the set S of occupied symbols to include symbols occupied by low priority dynamic grant PDSCH configurations.

Example 6 includes the subject matter of example 3, including or omitting optional elements, wherein the one or more processors are configured to cause the device to determine the set F of SPS PDSCH receptions by: identifying a set $L_{low}$ that includes low priority SPS PDSCH configurations for the slot for all configured component carriers, wherein each low priority SPS PDSCH configuration is assigned an index value; removing low priority SPS PDSCH configurations that collide with an uplink symbol from the set $L_{low}$; initializing a set S of occupied symbols in the slot to be $S_{high}$; initializing a counter $C_{low}$ of low priority SPS PDSCH configurations selected as low priority SPS PDSCH receptions to zero; initializing a set $F_{low}$ of low priority SPS PDSCH configuration index values having corresponding PDSCH selected as low priority SPS PDSCH receptions to null; until C is equal to the UE capability for number of SPS PDSCH receptions per slot or all high priority SPS PDSCH configurations in the set $L_{low}$ are considered: identify a low priority SPS PDSCH configuration in the set $L_{low}$ having a lowest configuration index value; determine if the low priority SPS PDSCH configuration includes a symbol in set S; when the low priority SPS PDSCH configuration does not include a symbol in set S: add the SPS PDSCH configuration index value to the set $F_{low}$; increment the counter C and the counter $C_{low}$; and add symbols occupied by the SPS PDSCH configuration to the set S, wherein the set F includes $F_{low}$.

Example 7 includes the subject matter of example 6, including or omitting optional elements, wherein the one or more processors are configured to cause the device to: initialize the set S of occupied symbols to include symbols occupied by low priority dynamic grant (DG) PDSCH configurations in the plurality of slots; and initialize the set C to a number of high priority DG PDSCH configurations the UE is capable of receiving in a slot combined with a number of low priority DG PDSCH configurations the UE is capable of receiving in a slot.

Example 8 includes the subject matter of example 6, including or omitting optional elements, wherein the one or more processors are configured to cause the device to determine the set F of SPS PDSCH receptions by: for each high priority DG PDSCH configuration in the slot: remove overlapping SPS PDSCH receptions that overlap with the high priority DG PDSCH configuration from $F_{high}$ and $F_{low}$; and when a total number of PDSCH receptions including the high priority DG PDSCH is greater than N, remove an SPS PDSCH reception having an SPS PDSCH configuration index from $F_{low}$ or, if $F_{low}$ is empty, $F_{high}$; and for each low priority DG PDSCH configuration in the slot: when the total number of PDSCH receptions including the low priority DG PDSCH is greater than N and $F_{low}$ is non-empty, remove an SPS PDSCH reception having a lowest SPS PDSCH configuration index value from $F_{low}$ and the DG PDSCH configuration is selected for reception, when the total number of PDSCH receptions including the low priority DG PDSCH is greater than N and $F_{low}$ is empty the low priority DG PDSCH is not selected for reception.

Example 9 includes the subject matter of example 2, including or omitting optional elements, wherein the one or more processors are configured to cause the device to determine the set F of SPS PDSCH receptions by: identifying a set L that includes SPS PDSCH configurations for the slot for all configured component carriers, wherein each SPS PDSCH configuration is assigned an index value that is indicative of priority; removing SPS PDSCH configurations that collide with an uplink symbol from the set L; initializing a set S of occupied symbols in the slot to be null; initializing a counter C of SPS PDSCH configurations selected as SPS PDSCH receptions to zero; initializing a set F of SPS PDSCH configuration index values having corresponding PDSCH selected as SPS PDSCH receptions to null; until C is equal to the UE capability for number of SPS PDSCH receptions per slot or all SPS PDSCH configurations in the set L are considered: identify a SPS PDSCH configuration in the set L having a lowest configuration index value; determine if the SPS PDSCH configuration includes a symbol in set S; when the SPS PDSCH configuration does not include a symbol in set S: add the SPS PDSCH configuration index value to the set F; increment the counter C and the counter C; and add symbols occupied by the SPS PDSCH configuration to the set S; separate the set F into a set of high priority SPS PDSCH receptions $F_{high}$ and a set of low priority SPS PDSCH receptions $F_{low}$ based on the configuration index values; and separate the set S into a set of symbols occupied by high priority SPS PDSCH receptions $S_{high}$ and a set of symbols occupied by low priority SPS PDSCH receptions $S_{low}$ based on the configuration index values.

Example 10 includes the subject matter of example 9, including or omitting optional elements, wherein the one or more processors are configured to cause the device to: for each DG PDSCH configuration in the slot: remove overlapping SPS PDSCH configurations that overlap with the DG PDSCH configuration from F; and when a total number of PDSCH receptions including the DG PDSCH is greater than N, remove an SPS PDSCH reception having a lowest SPS PDSCH configuration index value from F.

Example 1 includes the subject matter of any one of examples 1-10, including or omitting optional elements, wherein the one or more processors are configured to cause the device to: select an SPS-only type HARQ codebook when no PDSCH is scheduled by way of a dynamic grant for any of the plurality of slots.

Example 12 includes the subject matter of any one of examples 1-10, including or omitting optional elements, wherein the one or more processors are configured to cause the device to: determine whether a priority level is assigned to the SPS PDSCH configurations; and when at least one PDSCH is scheduled by way of a dynamic grant for any of the plurality of slots and a priority level is not assigned to the SPS PDSCH configurations, select a Type 1 HARQ codebook or Type 2 HARQ codebook.

Example 13 includes the subject matter of any one of examples 1-10, including or omitting optional elements, wherein the one or more processors are configured to cause the device to: determine whether a priority level is assigned to the SPS PDSCH configurations; and when at least one PDSCH is scheduled by way of a dynamic grant for any of the plurality of slots and a priority level is assigned to the SPS PDSCH configurations, select a Type 1 HARQ codebook or Type 2 HARQ codebook for high priority SPS PDSCHs and dynamic grant PDSCHs and a Type 1 HARQ codebook or Type 2 HARQ codebook for low priority SPS PDSCHs and dynamic grant PDSCHs.

Example 14 includes the subject matter of any one of examples 1-10, including or omitting optional elements, wherein the one or more processors are configured to cause the device to: determine a size the HARQ codebook for each slot based on the determined SPS PDSCH receptions for the slot.

Example 15 includes the subject matter of any one of examples 1-10, including or omitting optional elements, wherein the one or more processors are configured to cause the device to: determine a size of the HARQ codebook for each slot based on a number of active or inactive SPS PDSCH configurations in the slot for all component carriers.

Example 16 includes the subject matter of any one of examples 1-10, including or omitting optional elements, wherein the one or more processors are configured to cause the device to: determine a size of the HARQ codebook for each slot based on a number of active SPS PDSCH configurations in the slot for all component carriers.

Example 17 includes the subject matter of any one of examples 1-10, including or omitting optional elements, wherein the one or more processors are configured to cause the device to: divide a start and length indicator value (SLIV) table into a number of segments based on a length of a smallest SPS PDSCH reception in the determined set of SPS PDSCH receptions; and determine a size of the HARQ codebook for each slot based on the number of segments.

Example 18 includes the subject matter of any one of examples 1-10, including or omitting optional elements, wherein the one or more processors are configured to cause the device to: determine a first candidate size of the HARQ codebook for each slot based on a number of active SPS PDSCH configurations in the slot for all component carriers; divide a start and length indicator value (SLIV) table into a number of segments based on a length of a smallest SPS PDSCH reception in the determined set of SPS PDSCH receptions; determine a second candidate size of the HARQ codebook for each slot based on the number of segments; and determine the size of the HARQ codebook for each slot as the smaller of the first candidate size and the second candidate size.

Example 19 includes the subject matter of any one of examples 1-10, including or omitting optional elements, wherein the one or more processors are configured to cause the device to construct the HARQ codebook by: appending a single feedback bit for SPS reception to other feedback bits in the HARQ codebook.

Example 20 includes the subject matter of any one of examples 1-10, including or omitting optional elements, wherein the one or more processors are configured to cause the device to construct the HARQ codebook by: appending feedback bits for SPS reception to other feedback bits in the HARQ codebook.

Example 21 is a method, at user equipment (UE) node in a wireless network, including: identifying a physical uplink control channel (PUCCH) resource in a first slot for communicating a hybrid automatic repeat request (HARQ) codebook that provides feedback about semi-persistent scheduling (SPS) physical downlink shared channel (PDSCH) receptions in a plurality of slots that precede or include the first slot; determining a set of SPS PDSCH receptions for which feedback is multiplexed in the HARQ codebook based on SPS PDSCH configurations for each component carrier and each of the plurality of slots, a UE capability for number of SPS PDSCH receptions per slot, and a prioritization protocol; selecting a codebook type based on whether a PDSCH is scheduled by way of a dynamic grant for any of the plurality of slots; constructing the HARQ codebook based on the set of SPS PDSCH receptions and the selected codebook type; and transmitting the HARQ codebook to a next generation node B (gNB).

Example 22 includes the subject matter of example 21, including or omitting optional elements, including: determining the set of SPS PDSCH receptions for which feedback is multiplexed in the HARQ codebook by, for each of the plurality of slots and each component carrier configured for SPS communication with the UE: identifying a plurality of SPS PDSCH configurations for the slot and the component carrier; selecting zero or more SPS PDSCH configurations as SPS PDSCH receptions based on the UE capability for number of SPS PDSCH receptions per slot and the prioritization protocol; and adding the SPS PDSCH receptions to the set of SPS PDSCH receptions.

Example 22 includes the subject matter of example 21, including or omitting optional elements, including: determining the set F of SPS PDSCH receptions by: identifying a set $L_{high}$ that includes high priority SPS PDSCH configurations for the slot for all configured component carriers, wherein each high priority SPS PDSCH configuration is assigned an index value; removing high priority SPS PDSCH configurations that collide with an uplink symbol from the set $L_{high}$; initializing a set S of occupied symbols in the slot to be null; initializing a counter C of SPS PDSCH configurations selected as high priority SPS PDSCH receptions to zero; initializing a counter $C_{high}$ of high priority SPS PDSCH configurations selected as high priority SPS PDSCH receptions to zero; initializing a set $F_{high}$ of high priority SPS PDSCH configuration index values having corresponding PDSCH selected as high priority SPS PDSCH receptions to null; until C is equal to the UE capability for number of SPS PDSCH receptions per slot or all high priority SPS PDSCH configurations in the set $L_{high}$ are considered: identifying a high priority SPS PDSCH configuration in the set $L_{high}$ having a lowest configuration index value; determining if the high priority SPS PDSCH configuration includes a symbol in set S; when the high priority SPS PDSCH configuration does not include a symbol in set S: adding the SPS PDSCH configuration index value to the set $F_{high}$; incrementing the counter C and the counter $C_{high}$; and adding symbols occupied by the SPS PDSCH configuration to the set S, wherein the set F includes $F_{high}$.

Example 24 includes the subject matter of example 213, including or omitting optional elements, including: initializing the set S of occupied symbols to include symbols occupied by high priority dynamic grant PDSCH configurations in the plurality of slots; and initializing the set C to a number of high priority dynamic grant PDSCH configurations the UE is capable of receiving in a slot.

Example 25 includes the subject matter of example 23, including or omitting optional elements, including: initializing the set S of occupied symbols to include symbols occupied by low priority dynamic grant PDSCH configurations.

Example 26 includes the subject matter of example 23, including or omitting optional elements, including determining the set F of SPS PDSCH receptions by: for each high priority DG PDSCH configuration in the slot: removing overlapping SPS PDSCH receptions that overlap with the high priority DG PDSCH configuration from $F_{high}$ and $F_{low}$; and when a total number of PDSCH receptions including the high priority DG PDSCH is greater than N, removing an SPS PDSCH reception having a lowest SPS PDSCH configuration index value from $F_{low}$ or, if $F_{low}$ is empty, $F_{high}$; and for each low priority DG PDSCH configuration in the slot: when the total number of PDSCH receptions including the low priority DG PDSCH is greater than N and $F_{low}$ is non-empty, removing the SPS PDSCH configuration index from $F_{low}$ and the DG PDSCH configuration is selected for reception, when the total number of PDSCH receptions including the low priority DG PDSCH is greater than N and $F_{low}$ is empty the low priority DG PDSCH is not selected for reception.

Example 27 includes the subject matter of example 23, including or omitting optional elements, determining the set F of SPS PDSCH receptions by: identifying a set $L_{low}$ that includes low priority SPS PDSCH configurations for the slot for all configured component carriers, wherein each low priority SPS PDSCH configuration is assigned an index value; removing low priority SPS PDSCH configurations that collide with an uplink symbol from the set $L_{low}$; initializing a set S of occupied symbols in the slot to be $S_{high}$; initializing a counter $C_{low}$ of low priority SPS PDSCH configurations selected as low priority SPS PDSCH receptions to zero; initializing a set $F_{low}$ of low priority SPS PDSCH configuration index values having corresponding PDSCH selected as low priority SPS PDSCH receptions to null; until C is equal to the UE capability for number of SPS PDSCH receptions per slot or all high priority SPS PDSCH configurations in the set $L_{low}$ are considered: identifying a low priority SPS PDSCH configuration in the set $L_{low}$ having a lowest configuration index value; determining if the low priority SPS PDSCH configuration includes a symbol in set S; when the low priority SPS PDSCH configuration does not include a symbol in set S: adding the SPS PDSCH configuration index value to the set $F_{low}$; incrementing the counter C and the counter $C_{low}$; and adding symbols occupied by the SPS PDSCH configuration to the set S, wherein the set F includes $F_{low}$.

Example 28 includes the subject matter of example 27, including or omitting optional elements, including: initializing the set S of occupied symbols to include symbols occupied by low priority dynamic grant PDSCH configurations in the plurality of slots; and initializing the set C to a number of high priority dynamic grant PDSCH configurations the UE is capable of receiving in a slot combined with a number of low priority dynamic grant PDSCH configurations the UE is capable of receiving in a slot.

Example 29 includes the subject matter of example 22, including or omitting optional elements, including: determining the set F of SPS PDSCH receptions by: identifying a set L that includes SPS PDSCH configurations for the slot for all configured component carriers, wherein each SPS PDSCH configuration is assigned an index value that is indicative of priority; removing SPS PDSCH configurations that collide with an uplink symbol from the set L; initializing a set S of occupied symbols in the slot to be null; initializing a counter C of SPS PDSCH configurations selected as SPS PDSCH receptions to zero; initializing a set F of SPS PDSCH configuration index values having corresponding PDSCH selected as SPS PDSCH receptions to null; until C is equal to the UE capability for number of SPS PDSCH receptions per slot or all SPS PDSCH configurations in the set L are considered: identifying a SPS PDSCH configuration in the set L having a lowest configuration index value; determining if the SPS PDSCH configuration includes a symbol in set S; when the SPS PDSCH configuration does not include a symbol in set S: adding the SPS PDSCH configuration index value to the set F; incrementing the counter C and the counter C; and adding symbols occupied by the SPS PDSCH configuration to the set S; separating the set F into a set of high priority SPS PDSCH receptions $F_{high}$ and a set of low priority SPS PDSCH receptions $F_{low}$ based on the configuration index values; and separating the set S into a set of symbols occupied by high priority SPS PDSCH receptions $S_{high}$ and a set of symbols occupied by low priority SPS PDSCH receptions $S_{low}$ based on the configuration index values.

Example 30 includes the subject matter of example 29, including or omitting optional elements, including or each DG PDSCH configuration in the slot: removing overlapping SPS PDSCH configurations that overlap with the DG PDSCH configuration from F; and when a total number of PDSCH receptions including the DG PDSCH is greater than N, remove an SPS PDSCH reception having a lowest SPS PDSCH configuration index value from F.

Example 31 includes the subject matter of any one of examples 21-30, including or omitting optional elements, including: selecting an SPS-only type HARQ codebook when no PDSCH is scheduled by way of a dynamic grant for any of the plurality of slots.

Example 32 includes the subject matter of any one of examples 21-30, including or omitting optional elements, including: determining whether a priority level is assigned to the SPS PDSCH configurations; and when at least one PDSCH is scheduled by way of a dynamic grant for any of the plurality of slots and a priority level is not assigned to the SPS PDSCH configurations, selecting a Type 1 HARQ codebook or Type 2 HARQ codebook.

Example 33 includes the subject matter of any one of examples 21-30, including or omitting optional elements, including: determining whether a priority level is assigned to the SPS PDSCH configurations; and when at least one PDSCH is scheduled by way of a dynamic grant for any of the plurality of slots and a priority level is assigned to the SPS PDSCH configurations, selecting a Type 1 HARQ codebook or Type 2 HARQ codebook for high priority SPS PDSCHs and dynamic grant PDSCHs and a Type 1 HARQ codebook or Type 2 HARQ codebook for low priority SPS PDSCHs and dynamic grant PDSCHs.

Example 34 includes the subject matter of any one of examples 21-30, including or omitting optional elements, including: determining a size the HARQ codebook for each slot based on the determined SPS PDSCH receptions for the slot.

Example 35 includes the subject matter of any one of examples 21-30, including or omitting optional elements, including: determining a size of the HARQ codebook for each slot based on a number of active or inactive SPS PDSCH configurations in the slot for all component carriers.

Example 36 includes the subject matter of any one of examples 21-30, including or omitting optional elements, including: determining a size of the HARQ codebook for each slot based on a number of active SPS PDSCH configurations in the slot for all component carriers.

Example 37 includes the subject matter of any one of examples 21-30, including or omitting optional elements, including: dividing a start and length indicator value (SLIV) table into a number of segments based on a length of a smallest SPS PDSCH reception in the determined set of SPS PDSCH receptions; and determining a size of the HARQ codebook for each slot based on the number of segments.

Example 38 includes the subject matter of any one of examples 21-30, including or omitting optional elements, including: determining a first candidate size of the HARQ codebook for each slot based on a number of active SPS PDSCH configurations in the slot for all component carriers; dividing a start and length indicator value (SLIV) table into a number of segments based on a length of a smallest SPS PDSCH reception in the determined set of SPS PDSCH receptions; determining a second candidate size of the HARQ codebook for each slot based on the number of segments; and determining the size of the HARQ codebook for each slot as the smaller of the first candidate size and the second candidate size.

Example 39 includes the subject matter of any one of examples 21-30, including or omitting optional elements, including: constructing the HARQ codebook by appending a single feedback bit for SPS reception to other feedback bits in the HARQ codebook.

Example 40 includes the subject matter of any one of examples 21-30, including or omitting optional elements, including constructing the HARQ codebook by appending feedback bits for SPS reception to other feedback bits in the HARQ codebook.

Example 41 is an apparatus for a wireless communication device (device) serving as a next generation node B (gNB) in a wireless network, including one or more processors configured to cause the device to: determine, with respect to a user equipment (UE), a set of SPS PDSCH receptions in a plurality of slots for which feedback is multiplexed in a hybrid automatic repeat request (HARQ) codebook based on SPS PDSCH configurations for each component carrier and each of the plurality of slots, a UE capability for number of SPS PDSCH receptions per slot, and a prioritization protocol; select a codebook type based on whether a PDSCH is scheduled by way of a dynamic grant for any of the plurality of slots; receive a HARQ codebook from a UE providing feedback for the SPS PDSCH receptions; and interpret the HARQ codebook based on the set of SPS PDSCH receptions and the selected codebook type.

Example 42 includes the subject matter of example 41, including or omitting optional elements, wherein the one or more processors are configured to cause the device to: determine the set of SPS PDSCH receptions for which feedback is multiplexed in the HARQ codebook by, for each of the plurality of slots and each component carrier configured for SPS communication with the UE: identifying a plurality of SPS PDSCH configurations for the slot and the component carrier; selecting zero or more SPS PDSCH configurations as SPS PDSCH receptions based on the UE capability for number of SPS PDSCH receptions per slot and the prioritization protocol; and adding the SPS PDSCH receptions to the set of SPS PDSCH receptions.

Example 43 includes the subject matter of example 42, including or omitting optional elements, wherein the one or more processors are configured to cause the device to determine the set F of SPS PDSCH receptions by: identifying a set $L_{high}$ that includes high priority SPS PDSCH configurations for the slot for all configured component carriers, wherein each high priority SPS PDSCH configuration is assigned an index value; removing high priority SPS PDSCH configurations that collide with an uplink symbol from the set $L_{high}$; initializing a set S of occupied symbols in the slot to be null; initializing a counter C of SPS PDSCH configurations selected as high priority SPS PDSCH receptions to zero; initializing a counter $C_{high}$ of high priority SPS PDSCH configurations selected as high priority SPS PDSCH receptions to zero; initializing a set $F_{high}$ of high priority SPS PDSCH configuration index values having corresponding PDSCH selected as high priority SPS PDSCH receptions to null; until C is equal to the UE capability for number of SPS PDSCH receptions per slot or all high priority SPS PDSCH configurations in the set $L_{high}$ are considered: identify a high priority SPS PDSCH configuration in the set $L_{high}$ having a lowest configuration index value; determine if the high priority SPS PDSCH configuration includes a symbol in set S; when the high priority SPS PDSCH configuration does not include a symbol in set S: add the SPS PDSCH configuration index value to the set $F_{high}$; increment the counter C and the counter $C_{high}$; and add symbols occupied by the SPS PDSCH configuration to the set S, wherein the set F includes $F_{high}$.

Example 44 includes the subject matter of example 43, including or omitting optional elements, wherein the one or more processors are configured to cause the device to: initialize the set S of occupied symbols to include symbols occupied by high priority dynamic grant PDSCH configurations in the plurality of slots; and initialize the set C to a number of high priority dynamic grant PDSCH configurations the UE is capable of receiving in a slot.

Example 45 includes the subject matter of example 41, including or omitting optional elements, wherein the one or more processors are configured to cause the device to: initialize the set S of occupied symbols to include symbols occupied by low priority dynamic grant PDSCH configurations.

Example 46 includes the subject matter of example 43, including or omitting optional elements, wherein the one or more processors are configured to cause the device to determine the set F of SPS PDSCH receptions by: identifying a set bow that includes low priority SPS PDSCH configurations for the slot for all configured component carriers, wherein each low priority SPS PDSCH configuration is assigned an index value; removing low priority SPS PDSCH configurations that collide with an uplink symbol from the set $L_{low}$; initializing a set S of occupied symbols in the slot to be $S_{high}$; initializing a counter $C_{low}$ of low priority SPS PDSCH configurations selected as low priority SPS PDSCH receptions to zero; initializing a set $F_{low}$ of low priority SPS PDSCH configuration index values having corresponding PDSCH selected as low priority SPS PDSCH receptions to null; until C is equal to the UE capability for number of SPS PDSCH receptions per slot or all high priority SPS PDSCH configurations in the set $L_{low}$ are considered: identify a low priority SPS PDSCH configuration in the set $L_{low}$ having a lowest configuration index value; determine if the low priority SPS PDSCH configuration includes a symbol in set S; when the low priority SPS PDSCH configuration does not include a symbol in set S: add the SPS PDSCH configuration index value to the set $F_{low}$; increment the counter C and the counter $C_{low}$; and add symbols occupied by the SPS PDSCH configuration to the set S, wherein the set F includes $F_{low}$.

Example 47 includes the subject matter of example 46, including or omitting optional elements, wherein the one or more processors are configured to cause the device to: initialize the set S of occupied symbols to include symbols occupied by low priority dynamic grant PDSCH configurations in the plurality of slots; and initialize the set C to a number of high priority dynamic grant PDSCH configurations the UE is capable of receiving in a slot combined with a number of low priority dynamic grant PDSCH configurations the UE is capable of receiving in a slot.

Example 48 includes the subject matter of example 46, including or omitting optional elements, wherein the one or more processors are configured to cause the device to determine the set F of SPS PDSCH receptions by: for each high priority DG PDSCH configuration in the slot: remove overlapping SPS PDSCH configurations that overlap with the high priority DG PDSCH configuration from $F_{high}$ and $F_{low}$; and when a total number of PDSCH receptions including the high priority DG PDSCH is greater than N, remove an SPS PDSCH reception having a lowest SPS PDSCH configuration index value from $F_{low}$ or, if $F_{low}$ is empty, $F_{high}$; and for each low priority DG PDSCH configuration in the slot: when the total number of PDSCH receptions including the low priority DG PDSCH is greater than N and $F_{low}$ is non-empty, remove the SPS PDSCH configuration index from $F_{low}$ and the DG PDSCH configuration is selected for reception, when the total number of PDSCH receptions including the low priority DG PDSCH is greater than N and $F_{low}$ is empty the low priority DG PDSCH is not selected for reception.

Example 49 includes the subject matter of example 42, including or omitting optional elements, wherein the one or more processors are configured to cause the device to determine the set F of SPS PDSCH receptions by: identifying a set L that includes SPS PDSCH configurations for the slot for all configured component carriers, wherein each SPS PDSCH configuration is assigned an index value that is indicative of priority; removing SPS PDSCH configurations that collide with an uplink symbol from the set L; initializing a set S of occupied symbols in the slot to be null; initializing a counter C of SPS PDSCH configurations selected as SPS PDSCH receptions to zero; initializing a set F of SPS PDSCH configuration index values having corresponding PDSCH selected as SPS PDSCH receptions to null; until C is equal to the UE capability for number of SPS PDSCH receptions per slot or all SPS PDSCH configurations in the set L are considered: identify a SPS PDSCH configuration in the set L having a lowest configuration index value; determine if the SPS PDSCH configuration includes a symbol in set S; when the SPS PDSCH configuration does not include a symbol in set S: add the SPS PDSCH configuration index value to the set F; increment the counter C and the counter C; and add symbols occupied by the SPS PDSCH configuration to the set S; separate the set F into a set of high priority SPS PDSCH receptions $F_{high}$ and a set of low priority SPS PDSCH receptions $F_{low}$ based on the configuration index values; and separate the set S into a set of symbols occupied by high priority SPS PDSCH receptions $S_{high}$ and a set of symbols occupied by low priority SPS PDSCH receptions $S_{low}$ based on the configuration index values.

Example 50 includes the subject matter of example 49, including or omitting optional elements, wherein the one or more processors are configured to cause the device to: for each DG PDSCH configuration in the slot: remove overlapping SPS PDSCH configurations that overlap with the DG PDSCH configuration from F; and when a total number of PDSCH receptions including the DG PDSCH is greater than N, remove an SPS PDSCH reception having a lowest SPS PDSCH configuration index value from F.

Example 51 includes the subject matter of any one of examples 41-50, including or omitting optional elements, wherein the one or more processors are configured to cause the device to: select an SPS-only type HARQ codebook when no PDSCH is scheduled by way of a dynamic grant for any of the plurality of slots.

Example 52 includes the subject matter of any one of examples 41-50, including or omitting optional elements, wherein the one or more processors are configured to cause the device to: determine whether a priority level is assigned to the SPS PDSCH configurations; and when at least one PDSCH is scheduled by way of a dynamic grant for any of the plurality of slots and a priority level is not assigned to the SPS PDSCH configurations, select a Type 1 HARQ codebook or Type 2 HARQ codebook.

Example 53 includes the subject matter of any one of examples 41-50, including or omitting optional elements, wherein the one or more processors are configured to cause the device to: determine whether a priority level is assigned to the SPS PDSCH configurations; and when at least one PDSCH is scheduled by way of a dynamic grant for any of the plurality of slots and a priority level is assigned to the SPS PDSCH configurations, select a Type 1 HARQ codebook or Type 2 HARQ codebook for high priority SPS PDSCHs and dynamic grant PDSCHs and a Type 1 HARQ codebook or Type 2 HARQ codebook for low priority SPS PDSCHs and dynamic grant PDSCHs.

Example 54 includes the subject matter of any one of examples 41-50, including or omitting optional elements, wherein the one or more processors are configured to cause the device to: determine a size the HARQ codebook for each slot based on the determined SPS PDSCH receptions for the slot.

Example 55 includes the subject matter of any one of examples 41-50, including or omitting optional elements, wherein the one or more processors are configured to cause the device to: determine a size of the HARQ codebook for each slot based on a number of active or inactive SPS PDSCH configurations in the slot for all component carriers.

Example 56 includes the subject matter of any one of examples 41-50, including or omitting optional elements, wherein the one or more processors are configured to cause the device to: determine a size of the HARQ codebook for each slot based on a number of active SPS PDSCH configurations in the slot for all component carriers.

Example 57 includes the subject matter of any one of examples 41-50, including or omitting optional elements, wherein the one or more processors are configured to cause the device to: divide a start and length indicator value (SLIV) table into a number of segments based on a length of a smallest SPS PDSCH reception in the determined set of SPS PDSCH receptions; and determine a size of the HARQ codebook for each slot based on the number of segments.

Example 58 includes the subject matter of any one of examples 41-50, including or omitting optional elements, wherein the one or more processors are configured to cause the device to: determine a first candidate size of the HARQ codebook for each slot based on a number of active SPS PDSCH configurations in the slot for all component carriers; divide a start and length indicator value (SLIV) table into a number of segments based on a length of a smallest SPS PDSCH reception in the determined set of SPS PDSCH receptions; determine a second candidate size of the HARQ codebook for each slot based on the number of segments; and determine the size of the HARQ codebook for each slot as the smaller of the first candidate size and the second candidate size.

Example 59 includes the subject matter of any one of examples 41-50, including or omitting optional elements, wherein the one or more processors are configured to cause the device to: interpret a single feedback bit for SPS reception that is appended to other feedback bits in the HARQ codebook.

Example 60 includes the subject matter of any one of examples 41-50, including or omitting optional elements, wherein the one or more processors are configured to cause the device to: interpret feedback bits for SPS reception appended to other feedback bits in the HARQ codebook.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to perform operations, comprising:
   identifying a physical uplink control channel (PUCCH) resource in a slot for communicating a hybrid automatic repeat request (HARQ) codebook that provides feedback about semi-persistent scheduling (SPS) physical downlink shared channel (PDSCH) receptions in a plurality of slots that precede or include the slot; and determining a set of SPS PDSCH receptions and dynamic grant PDSCH receptions scheduled for the plurality of slots for which feedback is multiplexed in the HARQ codebook based on SPS PDSCH configurations for each component carrier and each of the plurality of slots, a UE capability for number of SPS PDSCH receptions per slot (N), a priority of the SPS PDSCH configurations, and a priority of the dynamic grant PDSCH receptions;

selecting a codebook type for the HARQ codebook based on whether a dynamic grant PDSCH is scheduled for any of the plurality of slots;

dividing a start and length indicator value (SLIV) table into a number of segments based on a length of a smallest SPS PDSCH reception in the determined set of SPS PDSCH receptions;

determining a size of the HARQ codebook for each slot based on the number of segments;

constructing the HARQ codebook based on the set of SPS PDSCH receptions, the determined size, and the selected codebook type; and causing transmission of the HARQ codebook to a base station.

2. The baseband processor of claim 1, wherein the operations further comprise:
selecting an SPS-only type HARQ codebook when no dynamic grant PDSCH is scheduled for any of the plurality of slots.

3. The baseband processor of claim 1, wherein the operations further comprise:
determining whether a priority level is assigned to the SPS PDSCH configurations; and
when at least one dynamic grant PDSCH is scheduled for any of the plurality of slots and a priority level is not assigned to the SPS PDSCH configurations, selecting a Type 1 HARQ codebook or Type 2 HARQ codebook.

4. The baseband processor of claim 1, wherein the operations further comprise:
determining whether a priority level is assigned to the SPS PDSCH configurations; and
when at least one dynamic grant PDSCH is scheduled for any of the plurality of slots and a priority level is assigned to the SPS PDSCH configurations, selecting a Type 1 HARQ codebook or Type 2 HARQ codebook for high priority SPS PDSCHs and dynamic grant PDSCHs and a Type 1 HARQ codebook or Type 2 HARQ codebook for low priority SPS PDSCHs and dynamic grant PDSCHs.

5. The baseband processor of claim 1, wherein the operations further comprise:
determining a first candidate size of the HARQ codebook for each slot based on a number of active SPS PDSCH configurations in the slot for all component carriers;
dividing a start and length indicator value (SLIV) table into a number of segments based on a length of a smallest SPS PDSCH reception in the determined set of SPS PDSCH receptions;
determining a second candidate size of the HARQ codebook for each slot based on the number of segments; and
determining the size of the HARQ codebook for each slot as the smaller of the first candidate size and the second candidate size.

6. The baseband processor of claim 1, wherein the operations further comprise:
appending a single feedback bit for SPS reception to other feedback bits in the HARQ codebook.

7. The baseband processor of claim 1, wherein the operations further comprise:
appending feedback bits for SPS reception to other feedback bits in the HARQ codebook.

8. A user equipment (UE), comprising a memory and one or more processors configured to, when executing instructions stored in the memory, cause the UE to:
identify a physical uplink control channel (PUCCH) resource in a slot for communicating a hybrid automatic repeat request (HARQ) codebook that provides feedback about semi-persistent scheduling (SPS) physical downlink shared channel (PDSCH) receptions in a plurality of slots that precede or include the slot; and
determine a set of SPS PDSCH receptions and dynamic grant PDSCH receptions scheduled for the plurality of slots for which feedback is multiplexed in the HARQ codebook based on SPS PDSCH configurations for each component carrier and each of the plurality of slots, a UE capability for number of SPS PDSCH receptions per slot (N), and a priority of the SPS PDSCH configurations, and a priority of the dynamic grant PDSCH receptions;
determining whether a priority level is assigned to the SPS PDSCH configurations; and
when at least one dynamic grant PDSCH is scheduled for any of the plurality of slots and a priority level is not assigned to the SPS PDSCH configurations, selecting either a Type 1 HARQ codebook or a Type 2 HARQ codebook;
construct the HARQ codebook based on the set of SPS PDSCH receptions and the selected codebook type; and
transmit the HARQ codebook to a base station.

9. The UE of claim 8, wherein the one or more processors are configured to cause the UE to determine a set F of SPS PDSCH receptions by:
identifying a set $L_{high}$ that includes high priority SPS PDSCH configurations for the slot for all configured component carriers, wherein each high priority SPS PDSCH configuration is assigned an index value;
removing high priority SPS PDSCH configurations that collide with an uplink symbol from the set $L_{high}$;
initializing a set S of occupied symbols in the slot to be null;
initializing a counter C of SPS PDSCH configurations selected as high priority SPS PDSCH receptions to zero;
initializing a counter $C_{high}$ of high priority SPS PDSCH configurations selected as high priority SPS PDSCH receptions to zero;
initializing a set $F_{high}$ of high priority SPS PDSCH configuration index values having corresponding PDSCH selected as high priority SPS PDSCH receptions to null;
until C is equal to the UE capability for number of SPS PDSCH receptions per slot or all high priority SPS PDSCH configurations in the set $L_{high}$ are considered:
identify a high priority SPS PDSCH configuration in the set $L_{high}$ having a lowest configuration index value;
determine if the high priority SPS PDSCH configuration includes a symbol in set S;
when the high priority SPS PDSCH configuration does not include a symbol in set S:
add the SPS PDSCH configuration index value to the set $F_{high}$;
increment the counter C and the counter $C_{high}$; and add symbols occupied by the SPS PDSCH configuration to the set S, wherein the set F includes $F_{high}$.

10. The UE of claim 9, wherein the one or more processors are configured to cause the UE to:
initialize the set S of occupied symbols to include symbols occupied by high priority dynamic grant PDSCH configurations in the plurality of slots; and
initialize the counter C to a number of high priority dynamic grant PDSCH configurations the UE is capable of receiving in a slot.

11. The UE of claim 10, wherein the one or more processors are configured to cause the UE to:
initialize the set S of occupied symbols to include symbols occupied by low priority dynamic grant PDSCH configurations.

12. The UE of claim 9, wherein the one or more processors are configured to cause the UE to determine the set F of SPS PDSCH receptions by:
identifying a set $L_{low}$ that includes low priority SPS PDSCH configurations for the slot for all configured component carriers, wherein each low priority SPS PDSCH configuration is assigned an index value;
removing low priority SPS PDSCH configurations that collide with an uplink symbol from the set $L_{low}$;
initializing a set S of occupied symbols in the slot to be $S_{high}$;
initializing a counter $C_{low}$ of low priority SPS PDSCH configurations selected as low priority SPS PDSCH receptions to zero;
initializing a set $F_{low}$ of low priority SPS PDSCH configuration index values having corresponding PDSCH selected as low priority SPS PDSCH receptions to null;
until C is equal to the UE capability for number of SPS PDSCH receptions per slot or all high priority SPS PDSCH configurations in the set $L_{low}$ are considered:
identify a low priority SPS PDSCH configuration in the set $L_{low}$ having a lowest configuration index value;
determine if the low priority SPS PDSCH configuration includes a symbol in set S;
when the low priority SPS PDSCH configuration does not include a symbol in set S:
add the SPS PDSCH configuration index value to the set $F_{low}$;
increment the counter C and the counter $C_{low}$; and
add symbols occupied by the SPS PDSCH configuration to the set S,
wherein the set F includes $F_{low}$.

13. The UE of claim 12, wherein the one or more processors are configured to cause the UE to:
initialize the set S of occupied symbols to include symbols occupied by low priority dynamic grant (DG) PDSCH configurations in the plurality of slots; and
initialize the counter C to a number of high priority DG PDSCH configurations the UE is capable of receiving in a slot combined with a number of low priority DG PDSCH configurations the UE is capable of receiving in a slot.

14. The UE of claim 12, wherein the one or more processors are configured to cause the UE to determine the set F of SPS PDSCH receptions by:
for each high priority DG PDSCH configuration in the slot:
remove overlapping SPS PDSCH receptions that overlap with the high priority DG PDSCH configuration from $F_{high}$ and $F_{low}$; and
when a total number of PDSCH receptions including the high priority DG PDSCH is greater than N, remove an SPS PDSCH reception having an SPS PDSCH configuration index from $F_{low}$, or, if $F_{low}$ is empty, $F_{high}$; and
for each low priority DG PDSCH configuration in the slot:
when the total number of PDSCH receptions including the low priority DG PDSCH is greater than N and $F_{low}$ is non-empty, remove an SPS PDSCH reception having a lowest SPS PDSCH configuration index value from $F_{low}$ and the DG PDSCH configuration is selected for reception,
when the total number of PDSCH receptions including the low priority DG PDSCH is greater than N and Flow is empty the low priority DG PDSCH is not selected for reception.

15. A user equipment (UE), comprising a memory and one or more processors configured to, when executing instructions stored in the memory, cause the UE to:
identify a physical uplink control channel (PUCCH) resource in a slot for communicating a hybrid automatic repeat request (HARQ) codebook that provides feedback about semi-persistent scheduling (SPS) physical downlink shared channel (PDSCH) receptions in a plurality of slots that precede or include the slot; and
determine a set SPS PDSCH receptions for which feedback is multiplexed in the HARQ codebook by
identifying a set L that includes SPS PDSCH configurations for the slot for all configured component carriers, wherein each SPS PDSCH configuration is assigned an index value that is indicative of priority,
removing SPS PDSCH configurations that collide with an uplink symbol from the set L,
initializing a set S of occupied symbols in the slot to be null,
initializing a counter C of SPS PDSCH configurations selected as SPS PDSCH receptions to zero,
initializing a set F of SPS PDSCH configuration index values having corresponding PDSCH selected as SPS PDSCH receptions to null,
until C is equal to a number (N) of UE capability for number of SPS PDSCH receptions per slot or all SPS PDSCH configurations in the set L are considered:
identify a SPS PDSCH configuration in the set L having a lowest configuration index value,
determine if the SPS PDSCH configuration includes a symbol in set S,
when the SPS PDSCH configuration does not include a symbol in set S:
add the SPS PDSCH configuration index value to the set F,
increment the counter C and the counter C, and
add symbols occupied by the SPS PDSCH configuration to the set S;
separate the set F into a set of high priority SPS PDSCH receptions $F_{high}$ and a set of low priority SPS PDSCH receptions $F_{low}$ based on the SPS PDSCH configuration index values; and
separate the set S into a set of symbols occupied by high priority SPS PDSCH receptions $S_{high}$ and a set of symbols occupied by low priority SPS PDSCH receptions $S_{low}$ based on the SPS PDSCH configuration index values, select a codebook type based on whether a PDSCH is scheduled by way of a dynamic grant for any of the plurality of slots;
construct the HARQ codebook based on the set of SPS PDSCH receptions and the selected codebook type; and
transmit the HARQ codebook to a base station.

16. The UE of claim 15, wherein the one or more processors are configured to cause the UE to:
for each DG PDSCH configuration in the slot:
remove overlapping SPS PDSCH configurations that overlap with the DG PDSCH configuration from F; and
when a total number of PDSCH receptions including the DG PDSCH is greater than the UE capability for number of SPS PDSCH receptions per slot (N), remove an SPS PDSCH reception having a lowest SPS PDSCH configuration index value from F.

\* \* \* \* \*